(12) United States Patent
Kent et al.

(10) Patent No.: US 6,173,006 B1
(45) Date of Patent: Jan. 9, 2001

(54) DIRECT SEQUENCE CDMA DEVICE AND METHOD FOR USING THE SAME

(75) Inventors: Mark Kent, Vista; Url M. Landau, San Diego; Elahe Sharifnejad Toosi, Coronado, all of CA (US)

(73) Assignee: LG Information & Communications, Ltd., Seoul (KR)

( * ) Notice: Under 35 U.S.C. 154(b), the term of this patent shall be extended for 0 days.

(21) Appl. No.: 09/151,258

(22) Filed: Sep. 11, 1998

(51) Int. Cl.[7] ............................. A61F 2/06; H04L 27/30
(52) U.S. Cl. ..................... 375/145; 375/146; 375/149; 370/206; 370/342
(58) Field of Search ............................. 375/140, 141, 375/145, 146, 147, 149, 130, 133–137; 370/203, 206, 342

(56) References Cited

U.S. PATENT DOCUMENTS

| | | | |
|---|---|---|---|
| 5,416,797 | * | 5/1995 | Gilhousen et al. ............ 370/209 |
| 5,648,983 | * | 7/1997 | Kostic et al. ................. 375/150 |
| 5,703,873 | * | 12/1997 | Ojanpera et al. ............. 370/332 |
| 5,841,806 | * | 11/1998 | Gilhousen et al. ............ 375/146 |
| 5,867,525 | * | 2/1999 | Giallorenzi et al. .......... 375/145 |
| 5,870,378 | * | 2/1999 | Huang et al. ................. 370/209 |
| 5,894,473 | * | 4/1999 | Dent ............................. 370/342 |
| 5,926,503 | * | 7/1999 | Kelton et al. ................. 375/148 |
| 5,943,361 | * | 8/1999 | Gilhousen et al. ............ 375/142 |
| 5,991,332 | * | 11/1999 | Lomp et al. .................. 375/152 |

* cited by examiner

*Primary Examiner*—Stephen Chin
*Assistant Examiner*—Lenny Jiang
(74) *Attorney, Agent, or Firm*—Bernard L. Kleinke; Foley & Lardner

(57) ABSTRACT

The scaleable CDMA communication system comprises a new spreading code operating at an increased chip rate. The chip rate is selected to be a multiple of a base chip rate, and the new spreading code is created by repeating a base spreading code. Synchronization frames are thereby consistent with established CDMA communication systems. After spreading, a periodic phase rotation is applied to the communication signals, thereby providing a synchronization marker. The phase rotation and resulting synchronization marker enables subscriber units to synchronize to system timing with a minimum of ambiguity.

24 Claims, 19 Drawing Sheets

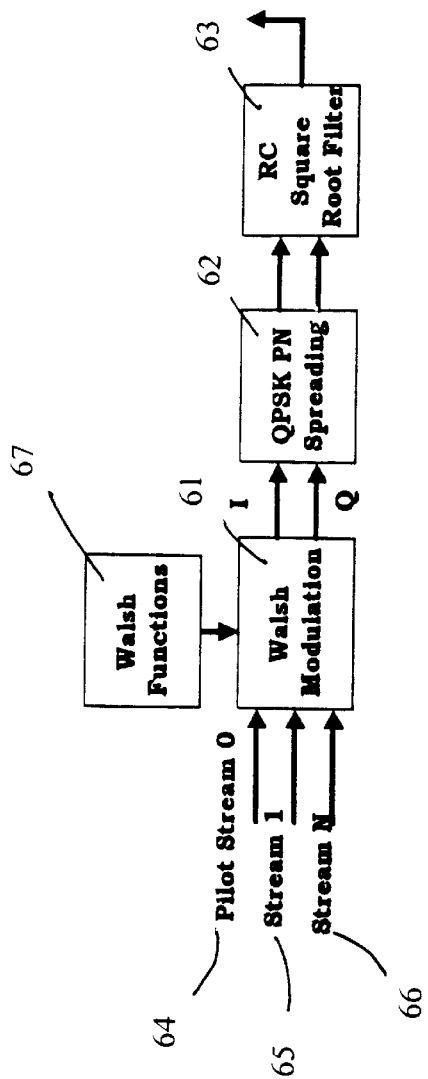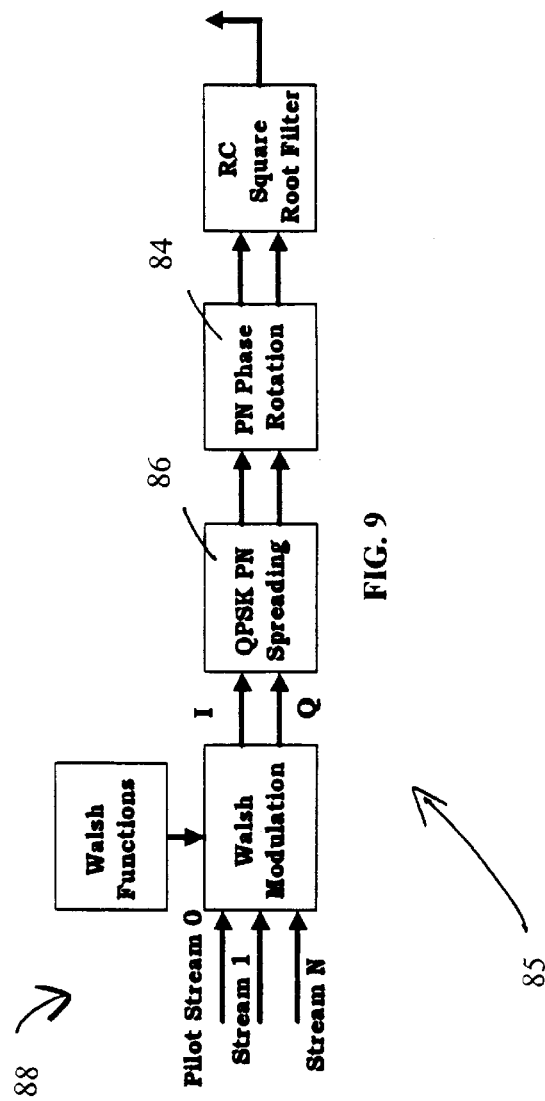
FIG. 8
FIG. 9

θ is an arbitrary phase

ND METHOD FOR USING THE SAME

DIRECT SEQUENCE CDMA DEVICE AND METHOD FOR USING THE SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The field of the present invention is wireless communication devices and methods for using the same. In particular, the present invention relates to Code Division Multiple Access (CDMA) spread spectrum transmission devices and methods.

2. Background Art

Code Division Multiple Access (CDMA) is a communications technology based on the principals of spread spectrum communication. Users in a CDMA system share the same carrier frequency and bandwidth, but are differentiated by encoding data with a pseudo-noise (PN) spreading signal. Since users share frequency and bandwidth, CDMA allows more users to access the wireless network simultaneously than with other systems such as Time Division Multiple Access.

Generally, a CDMA communication system is deployed using a cellular-type network system. In a cellular system the geography is divided into several adjacent zones of coverage, called "cells". Each cell in the network has at least one base station transceiver that establishes a communication link with subscriber equipment located within or near the cell. Subscriber equipment is often a mobile unit, as exemplified by car telephones. As the subscriber equipment moves from one cell to an adjacent cell, the system provides a "handoff" between base stations for any communication in progress. Thereby, the subscriber moves from cell to cell without interruption to the communication.

CDMA is presently gaining widespread acceptance in the United States and other countries throughout the world. In the United States, CDMA has matured into standards that are administered by the Telecommunications Industry Association (TIA). The present standards are known as IS-95 (TIA) and J-STD-008 (ANSI).

Present devices using CDMA technology as defined by IS-95 utilize a base clock rate of 1.2288 MHz. This base clock rate is generally referred to as the "chip" rate, and is the rate at which the system encodes and spreads the communication signal. IS-95 compliant systems are $2^{nd}$ generation CDMA systems that are generally referred to as 1X systems. The "1X" refers to the chip rate of 1.2288 Mhz. With a chip rate of 1.2288 MHz, an IS-95 compliant system occupies a spectral bandwidth of 1.25 MHz.

1X CDMA as defined by current standards IS-95 is a "Frame-Based" communication system that derives its timing reference for system operation from the Global-Positioning-System (GPS). Transmissions are referenced to a common system-wide timing reference provided by the GPS system. This time reference is referred to as the Universal-Coordinated-Time (UTC). The UTC provides a signal that CDMA equipment receives and decodes to establish a system-wide time base. The start of CDMA system time is defined to be Jan. $6^{th}$, 1980 00:00:00 UTC, which coincides with the start of GPS time. From 00:00:00 UTC, 1X CDMA codes were initialized.

For 1X CDMA the spreading code contains $2^{15}$(32,768) codes. The spreading code, sometimes referred to as the Short-Code-Pseudo-Noise (PN) sequence, is utilized at the chip rate of 1.2288 MHz. Therefore, the PN spreading code has a period of 26.67E-3 seconds (32,768 codes/1.2288 MHz).

Also, 1X CDMA uses a second code to scramble transmission to and from the subscriber unit. The second code is called the long code. The long-code-PN-sequence is $2^{41}$ chips in length, also encoded at a rate of 1.2288 MHz. Therefore, the long-code-PN-sequence has a period of about 20.71 days ($2^{41}$/1.2288E6/60/60/24). The long-code-PN-sequence, like the short code, is also initialized from 00:00:00 UTC.

Referring now to FIG. 4 the frame timing of a CDMA system is diagramatically shown. The diagram shows a first even second tick mark 20 received from the GPS system and a second even second tick mark 22 received from the GPS. The elapsed time between tick mark 20 and second tick mark 22 is therefore two seconds. This two second elapsed time is divided evenly into 25 synchronization frames 24. Each of the sync frames 24, such as sync frame 26, is therefore 80 msec long. As previously discussed, the PN short code in a 1X system repeats every 26 ⅔ msec. As the 26 ⅔ msec period is exactly one-third of the 80 msec sync frame, the PN spreading code is repeated three times within the 80 msec sync frame. Thereby FIG. 4 shows repeat 0 (28) of the PN code, repeat 1 (29) of the PN code, and repeat 2 (30) of the PN code are all contained within the sync frame 26.

Each time the PN spreading repeats, the PN spreading code is said to "roll". Therefore, PN roll 31 corresponds to the beginning of the repeat 0 (28), PN roll 32 corresponds to the beginning of the PN repeat 1 (29), and PN roll 33 corresponds the beginning of the repeat 2 (30). Therefore, in a 1X CDMA system as shown in FIG. 4, each sync superframe 26 will comprise three PN rolls: 31, 32 and 33.

In the current CDMA technology, identifying the beginning of a sync channel message capsule amounts to several tasks:

1. Read the SOM bit (Start Of Message) located at the 26 ⅔ frame boundary;
2. If this value is One, read the sync channel message capsule, decode its CRC parity pattern; and
3. If parity is zero, the beginning of the sync message is identified, else, go to step 1.

Thus, the process involved in identifying the sync message is a complex operation that may have to be repeated multiple times before a positive identification occurs. The repeated PN Roll introduces an overhead due to the ambiguity in the location of the beginning of the message. More specifically, each PN Roll may appear to be the beginning of the sync channel super frame. This process described above is carried out until a positive identification is achieved. This identification process is carried out repeatedly while the subscriber unit is in a sync channel acquisition mode. This timing ambiguity causes delay in synchronization, and causes the subscriber equipment to use more power. If the subscriber equipment is battery operated, batteries deplete faster or must be made larger to accommodate the power drain.

U.S. Pat. No. 5,703,873 describes a method and apparatus for synchronizing subscriber equipment with base stations in a CDMA radio network. This patent describes a modification to the existing CDMA standard wherein the pilot channel is modulated to contain information that allows a subscriber unit to more efficiently synchronize with the base station. However, such a system fails to be compatible with existing implementations of the CDMA communications system. Without backward compatibility, existing investments in base stations and subscriber units may be lost.

Due to the popularity of the CDMA 1X system currently deployed, CDMA systems are becoming saturated with users and are unable to satisfy the communication demands of progressing technologies. Therefore, it is necessary that a new CDMA system be developed for handling increased data capacities. Such increased capacities allow users to transmit data at a higher rate and more efficiently. This next generation of CDMA system, thereby will hereinafter be referred to as a third generation (3G) CDMA system.

It is generally recognized that two options for 3G CDMA exist. As shown in FIG. 1, the first option is a multiple-carrier implementation 42. The multiple-carrier implantation 42 uses parallel implementations of the current 1X CDMA systems, thereby allowing for larger bandwidth by processing more than one 1.25 MHz. The second option is a direct-sequence implementation that increases the bandwidth and defines a new system that increases the system chip rate by multiples of 1.2288 Mhz.

Referring to FIG. 2, in the multi-carrier CDMA system 42, the processing unit 46 is a bank of parallel processors, 47, 48, and 49, one for each of the RF carriers. Although conceptually simple to implement, the multi-carrier system vastly increases the part-count and complexity of the CDMA system. In contrast, as shown in FIG. 3, the processing unit 48 for a direct sequence implementation retains the simpler architecture of an 1X system. While each of the above options occupy a similar bandwidth, clearly the Direct Sequence CDMA has an advantage over the latter in terms of component count. Unfortunately, the direct-sequence implementation aggravates the timing ambiguities described above. For example, if the CDMA system operates at a clock rate 3 times the base chip rate, then the PN code will repeat 9 times in each synchronization frame. Now, rather than 3 PN rolls as in a 1X system, the system will need to contend with 9 PN rolls.

Therefore, there exists a need for a new 3G CDMA system with increased data capacity but backwardly compatible to existing CDMA implementation.

SUMMARY OF THE INVENTION

Any $3^{rd}$ generation technology for usage within the CDMA community must ensure backward compatibility. In order to define a technology for future 3G systems it would be highly desirable to design a new system that easily scales up or down from current $2^{nd}$ generation 1X CDMA. To remain backwardly compatible, any new system must use a new Short-Code-PN-sequence that has a period of 26.67 Msec, the new Short-Code-PN-sequence should be easily generated, and Base Stations must be located at equivalent distances as defined for 1X CDMA. Further, Base Station PN phase must be a function of the Base Station ID and the GPS-Even-Second-Tick must be locatable from any base station within the Network.

It is therefore an object of the present invention to provide a communication system having increased data throughput but still retaining compatibility with an existing communication standard.

To overcome the disadvantages described above and meet the objectives of the present invention, a scaleable CDMA communication system is described. The scaleable CDMA communication system comprises a new spreading code operating at an increased chip rate. The chip rate is selected to be a multiple of a base chip rate, and the new spreading code is created by repeating a base spreading code. Synchronization frames are thereby consistent with established CDMA communication systems. After spreading, a periodic phase rotation is applied to the communication signals, thereby providing a synchronization marker. The phase rotation and resulting synchronization marker enable subscriber units to synchronize to system timing with a minimum of ambiguity.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings. For illustration purposes the drawings may not be to scale and may exaggerate an offset or other position.

FIG. 8 diagramatically shows base station modulation and filtering.

FIG. 9 diagramatically shows base station modulation and filtering with PN phase rotation in accordance with the present invention.

BEST MODE FOR CARRYING OUT THE INVENTION

Figure 6:
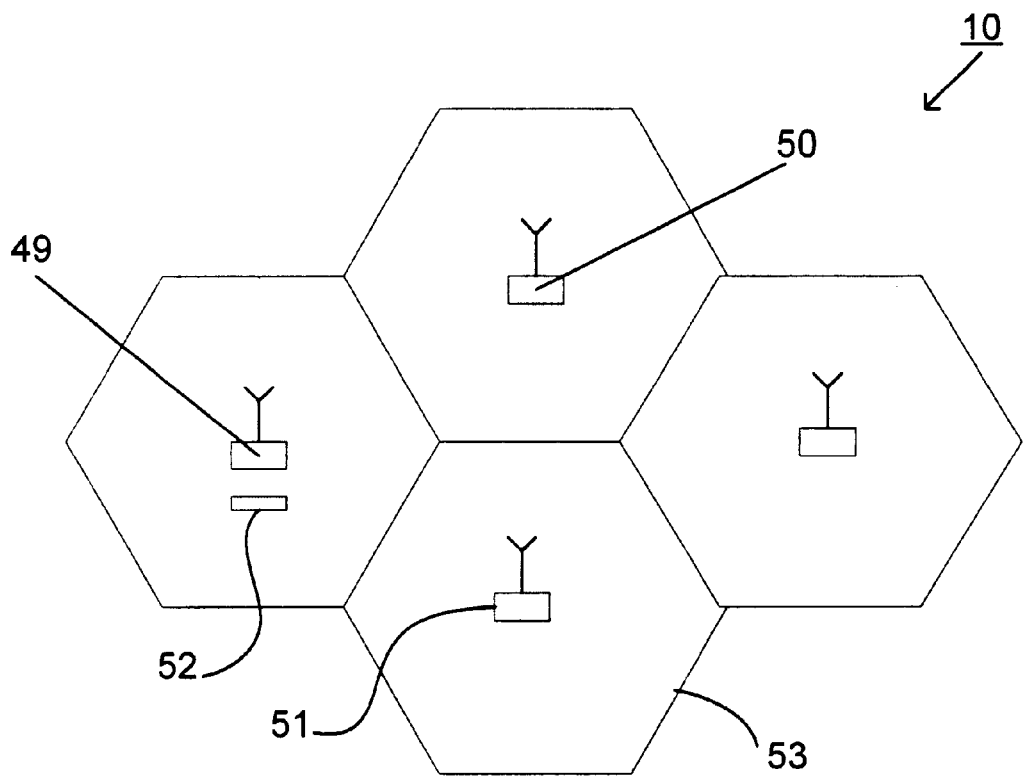
FIG. 6 is a diagram showing two cells each having a base station capable of communicating with a subscriber unit.

FIG. 6 shows a new scaleable 3G CDMA system 10 constructed in accordance with the present invention. The 3G CDMA system 10 comprises new Base Stations 49, 50 and 51 and new subscriber units 52. The new Base Stations 49, 50 and 51 and subscriber units 52 are implemented on a cell structure 53 which is similar to the cell structure implemented for a 1X system. The scaleable CDMA system 10 operates at a chip rate that is a multiple of the base chip rate of 1.2288 MHz. Preferably, scaleable CDMA system 10 selects 3,6, 9, or 12 as the multiple. For example, if 3 is selected as the multiple, the 3G CDMA system 10 would operate with a chip rate of 3.6864 MHz. Due to the increase chip rate the 3G CDMA system 10 allows for higher data capacities and more efficient communications. Significantly, the scaleable 3G CDMA system 10 remains backwardly compatible with existing IS-95 CDMA implementations.

In order to implement the scaleable 3G CDMA system 10, three issues are addressed. First, a new PN sequence is defined that retains compatibility with existing systems. Second, a new offset scheme is defined using the new PN sequence while remaining consistent with existing frame timing. Finally, a PN phase rotation is used to reduce timing ambiguities present due to increased chip rate and PN modes.

The scaleable communication system described herein uniquely provides a PN code series—a basic element of the CDMA network—at the different chip rates while utilizing the same hardware. The system also utilizes the same set of offsets for all the chip rates, thereby minimizing the hardware and software complexity and also reducing the overhead on both the subscriber unit stations and the base stations.

The new communications system inherits many of its characteristics from the 1X system and thus performs the PN code acquisition and Sync channel decoding tasks with minimum of complexity and changes. Thereby, implementation of both 1X and 3X, or other multiples, on the same subscriber units thus becomes attractive.

In using the 3G CDMA system 10, the subscriber unit initiates a search for a Base Station signal as its first task to communicate with a Base Station. In a spread spectrum system, the ability to detect the Base Station signal is conditioned by locking, first, to the Base Station PN series. Since the beginning of this periodic series is unknown, the subscriber unit must 'search' over a whole PN period.

1X CDMA provides for 512-Distinct-Base-Stations. Distinct base stations are identified by the offset of the short-PN-code with respect to the GPS-Even-Second-Tick-Mark. Base Station 0 has a PN-short-code sequence that has perfect alignment with the GPS-Even-Second-Tick. For this reason, Base-Station 0's short-code-PN-sequence is given a special name. It is called the "Zero-Offset" point.

For example, in Base-Station 1, the short-code-PN-sequence begins 64 chips after the zero-offset, and for Base-Station 2, the short-code-PN-sequence begins 128 chips after the zero-offset. Since there are a total of 32,768 chips, and 512 Base-Stations, each base station is located at increments of 64 chips from the zero-offset. In a CDMA system, each base station is identified by an index 75 number, 0-511, as depicted in FIG. 5.

Figure 5:
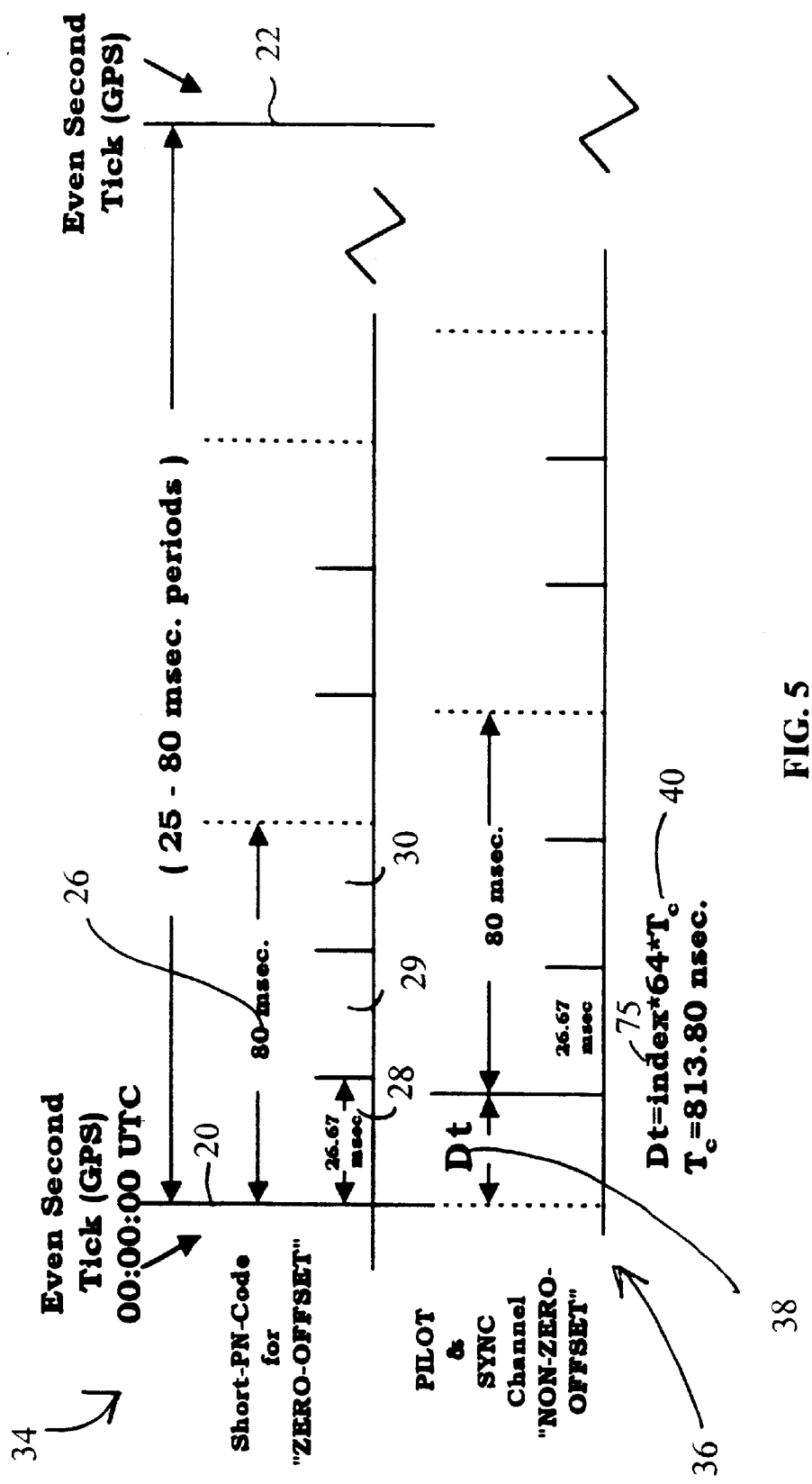
FIG. 5 is a diagram showing synchronization frame offset from the even—second tick mark of the GPS system.

FIG. 5 shows the timing for Base Station 0 (34) and the timing for Base Station N (36) where N is any Base Station having an index number 1-511. Each of the Base Stations 1-511 is therefore offset from the even second tick mark 20. This offset time is represented on the diagram as Dt 38. The value of Dt can be calculated using equation 40. In equation 40, the "index" 75 represents the Base Station number 1-511. Tc is the time for one system chip. With the system operating at 1.2288 MHz, each chip is 813.80 nsec in duration. As discussed earlier, each base station is separated from the next numerical base station by 64 PN codes. Therefore equation 40 indicates that the offset time for any base station can be calculated by multiplying the index number by 64 and that result by the duration of one chip. For example, base Station 1 is offset from the even second tick mark 20 by 52.0832 msec (1*64*813.80 msec). Timing offsets for the other Base Stations 2-511 may be calculated in a similar manner.

For 1X CDMA, by locating the Base-Stations at 64 Chip intervals, the likelihood of a Subscriber unit receiving a signal from two base stations with nearly the same phase is almost zero. This is a critical factor for efficient soft handoff within the network.

In a CDMA cellular network the offset of the PN series is used to identify different Base Stations. The PN series, has a period of 26 ⅔ msec, which starts at a different time at each Base Station. By locating the beginning of the PN sequence (PN roll), a subscriber unit that receives a signal from two Base Station is able to differentiate the two Base Stations by their temporally different PN Rolls. Each Base Station has a PN roll that is offset at a unique temporal point relative to the even second marks of the GPS system. For example a Base Station designated by the number 0 has its PN Roll exactly at a multiple of 2 seconds relative to UTC. A Base Station designated by the number 1 has its PN Roll shifted from Base Station 0. Base Station 0 and Base Station 1 are thereby differentiated by their offset from even GPS tick marks.

Once the subscriber unit completes a search and locks to the Base Station PN series, the subscriber unit can decode the Base Station information. Base Station information is contained in an overhead channel identified as the sync channel. Among the decoded parameters on the sync channel are the Base Station identification number. The identification number provides the user with the shift (offset) for a particular Base Station relative to Base Station 0. The base station identification corresponds to the index as discussed referring to FIG. 5. With knowledge of the offset, the subscriber unit can identify the global time which is necessary to establish a full communication with the Base Station.

As the service is extended to wider bandwidth (3X, 6X, 9X and 12X), the PN chip clock operates at a multiple rate of the base chip rate. Consequently, in order to maintain the same PN period of 26 ⅔ msec the scaleable CDMA system generates a new PN series and distributes new PN offsets.

The creation of the new PN series and assignment of affects are addressed below. A simple mechanism which generates a new PN series with a given offset is essential in a scaleable CDMA network.

For simplicity and compatibility with existing CDMA systems, the scaleable CDMA system uses a new PN series that repeats the existing 32,768 PN codes. For example, in a 3X system the new PN series is 98,304 codes long, comprising three repetitions of the existing 32,768 PN code. Since the chip rate is three times the base chip rate, this new PN code series has a period of 26 ⅔ msec, which is identical to the PN code series of the existing 1X systems. In a similar manner a 6X system would have a new PN series consisting of six repetitions of the existing PN code, a 9X system would have nine repetitions of the existing PN code, and a 12X system would have 12 repetitions of the existing PN code.

In the scaleable CDMA system the system chip rate is preferably a multiple factor of the fundamental rate, 1.2288 MHz, as shown in the table below:

TABLE 1

Chip Rate for 1X, 3X, 6X, 9X, 12X

| Spreading Rate NX | Chip Rate Hz |
| --- | --- |
| 1X | 1.2288 E6 |
| 3X | 3.6864 E6 |
| 6X | 7.3728 E6 |
| 9X | 11.0592 E6 |
| 12X | 14.7456 E6 |

Given a Base Station with ID $n_N$ ($n_N$=0, 1, ..., 511) its offset is found as follows:

$$n_N \cdot N \cdot 64 = K \cdot 2^{15} + K \cdot 64 + n_1 \cdot 64 + K \cdot 64 \cdot \delta(N)$$

Where $n_N$—is the Base Station ID number in XN type system (N=1, 3, 6, 9 or 12 relating to a 1X, 3X, 6X, 9X, or 12X system, respectively)

K—is the Repeat number (K=0, N-1)

$n_1$—is the Base Station ID in X1 system $\delta(N)$—is a correction factor of 3 for N=6, 12 and 0 for 1, 3, and 9

Figure 7:
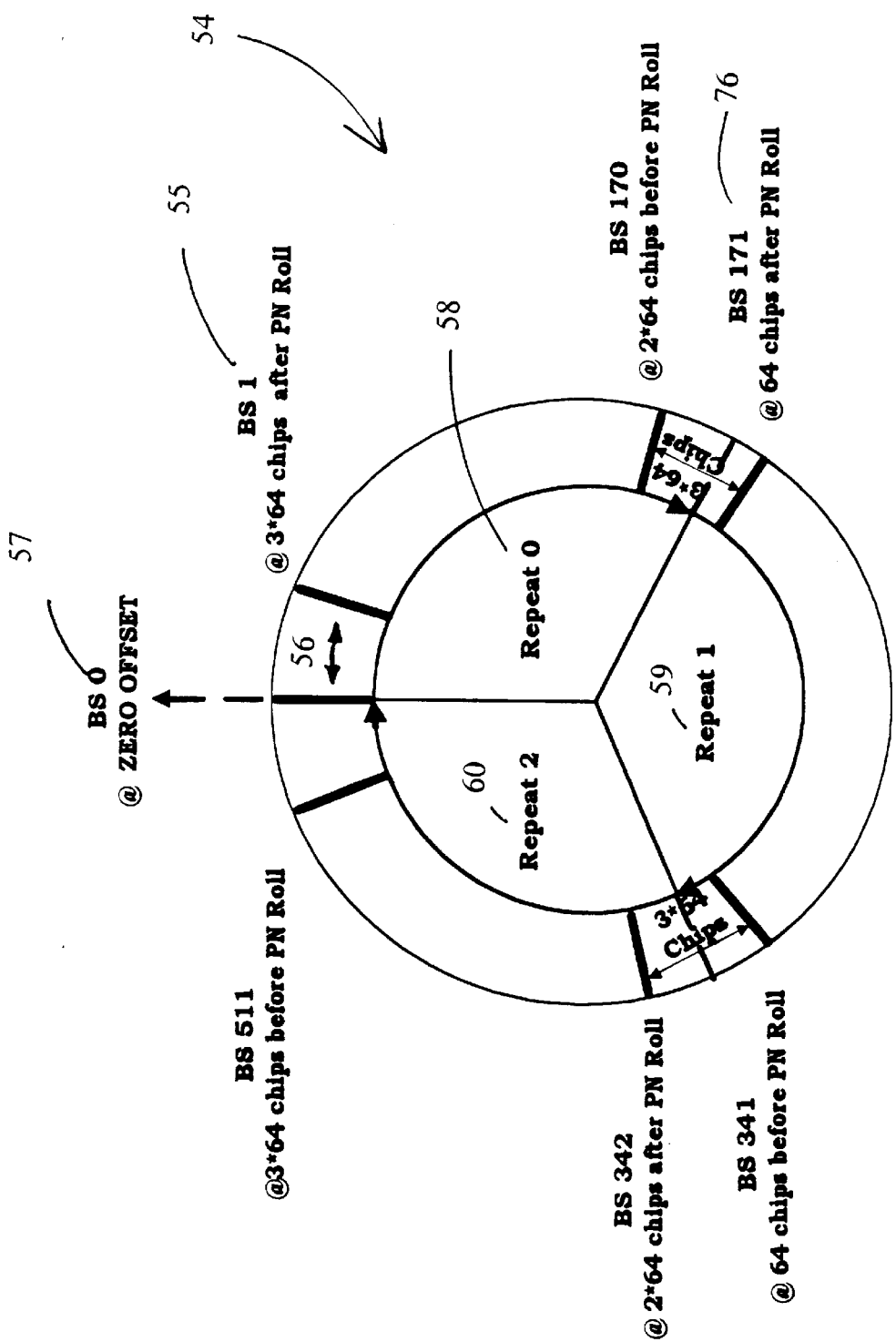
FIG. 7 is a diagrammatic view of base station offsets for a third generation CDMA system having a 3X code in accordance with the present invention.

Table 2 below, shows the calculated offset for a 3X system relative to Base Station 0. Further, FIG. 7 diagramatically shows Base Station offset 54 for the 3X system. For example, Base Station 155 is offset 192 chips 56 from Base Station 0. Note, however, that FIG. 7 is not drawn to scale and the offsets are exaggerated for demonstration purposes. FIG. 7 also shows that the base PN code is repeated 3 times in a 3X system. Repeat 0 (58), repeat 1(59), and repeat 2(60) each consist of the 32,768 base PN codes.

TABLE 2

Base Station Offset

| Base Station ID | Base Station OFFSET [chip time] | $PN_{15}$ Code Number | Repeat Number |
| --- | --- | --- | --- |
| 0 | 0 · 64 | 0 | 0 |
| 1 | 1 · 3 · 64 | 64 | 0 |
| ... | ... | ... | ... |
| 170 | 170 · 3 · 64 | $2^{15} - 128$ | 0 |
| 171 | 171 · 3 · 64 | 64 | 1 |
| ... | ... | ... | ... |
| 341 | 341 · 3 · 64 | $2^{15} - 64$ | 1 |
| 342 | 342 · 3 · 64 | 128 | 2 |
| ... | ... | ... | ... |
| 511 | 511 · 3 · 64 | $2^{15} - 3 \cdot 64$ | 2 |

At each Repeat the base stations are grouped into a cluster (for example, in Repeat 0 Base Stations 0 to 170 are members of the cluster). The distance of two adjacent members of any cluster is 3·64 chips. For example, Base Station 057 and Base Station 155 are offset by 3·64 chips. However, the three repeats are interlaced with the Base Station of each Repeat Offset only 64 chips from a corresponding Base Station in the next repeat. For example Base Station 0 55 and Base Station 171 76 are operating in different repeats, but are on codes that have an offset of 0 and 64 respectively. Since this offset of 64 chips in 3X is only about 17 usec, topographically, these two Base Stations should not placed adjacent to each other to avoid possible interference. In a similar manner, as the chip rate is further increased, Base Station placement becomes more important to minimize potential interference and timing ambiguities. However, as will be discussed later, by detecting and tracking which repeat a code is in, the CDMA system may be able to minimize such potential interference.

With the new PN series created and offset defined, PN-Phase rotation is now discussed. PN-Phase Rotation is a mechanism which allows the establishment of a reference synchronization marker for a communications system. PN-Phase Rotation enables the identification of the PN roll at the beginning of a sync frame, thereby reducing synchronization ambiguities.

For the purpose of describing the scaleable CDMA system, the transmitter at the base station is described as a block that processes multiple streams of bits (a bit or a symbol is represented by pair of values +1 and −1) and sends it on a single RF bandwidth. That is, in CDMA, all the bit streams are sharing the same bandwidth. A subscriber unit is able to receive and extract a unique bit stream (or several bit streams) due to the process of coding (modulation) that is done in the Base Station transmitter.

Figure 10:
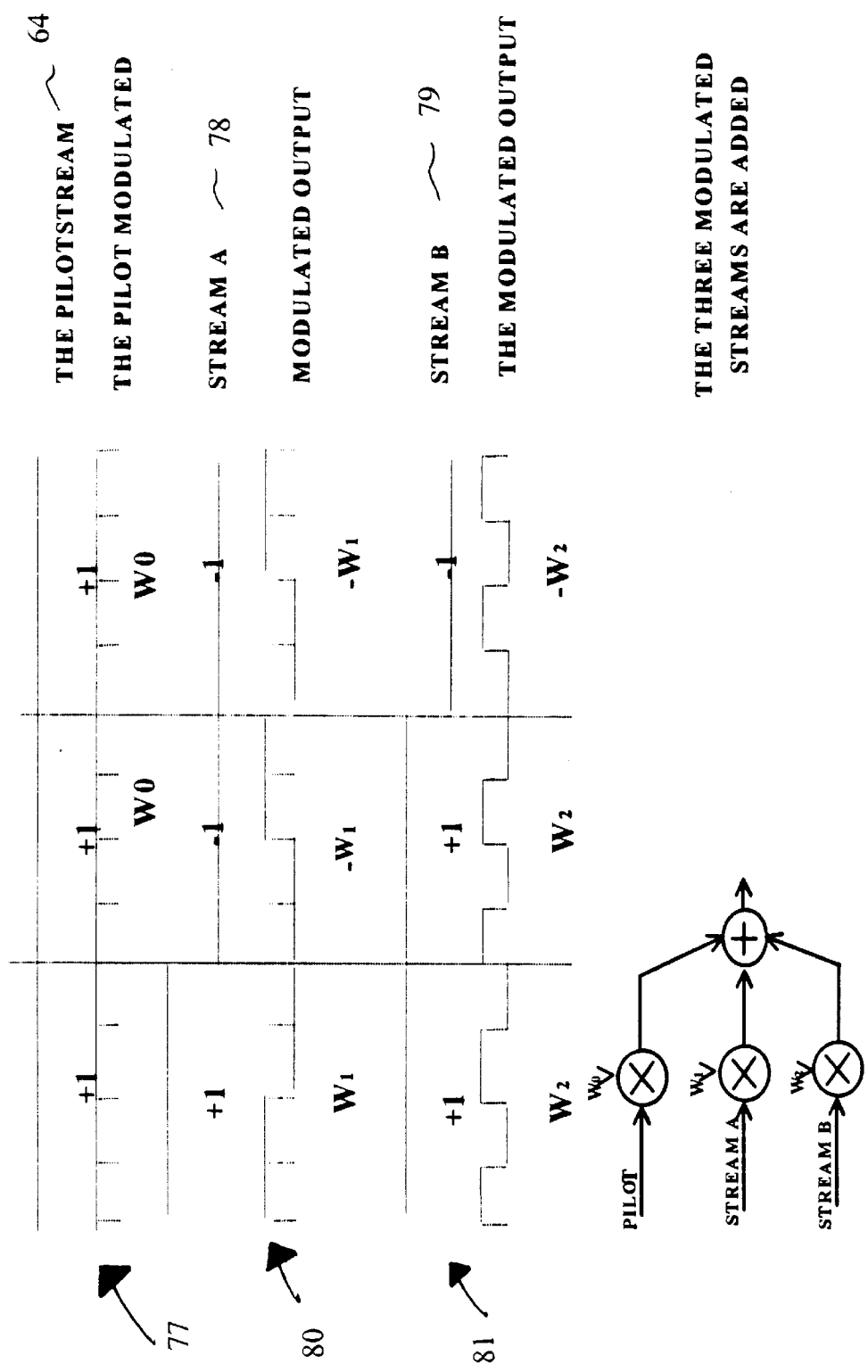
FIG. 10A diagramatically shows a block diagram of a pilot and two data streams modulated with Walsh codes.
FIG. 10B illustrates graphically the operation of the arrangement of FIG. 10A.
Figure 11:
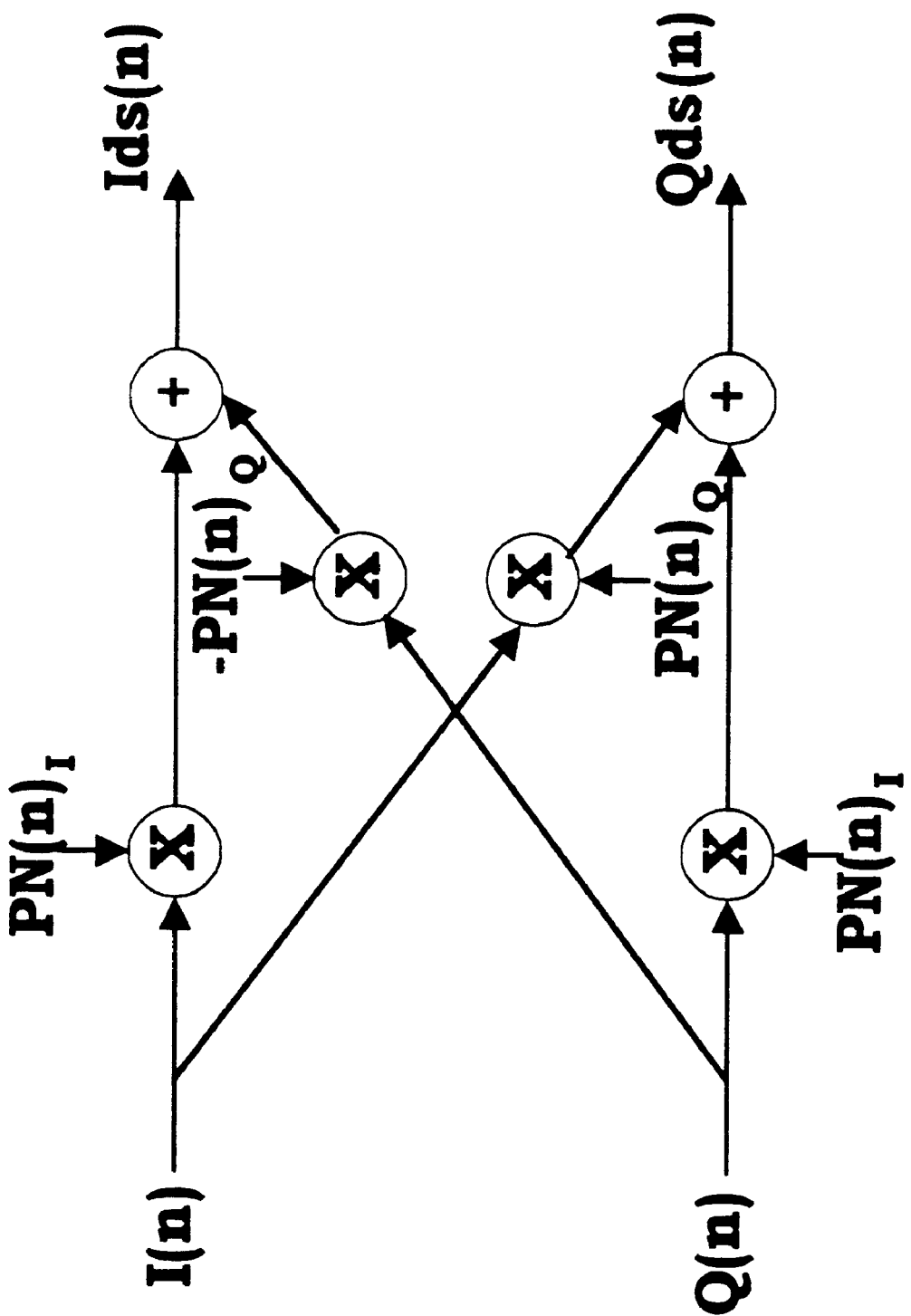
FIG. 11 diagramatically shows PN spreading rotation in accordance with the present invention.

The transmission process is divided logically into the three main blocks shown in FIG. 8: Walsh modulation 61, QPSK PN Spreading 62, and the RC (Raised Cosine) Square Root Filtering 63. Overhead and data channels each represent a bit stream. FIG. 8 shows a pilot stream 64 and two date streams 65 and 66. Each bit stream is allocated a unique coding function out of a set of codes called Walsh functions 67. FIG. 10A shows an arrangement to illustrate the Walsh modulation is performed. For demonstration purposes a Walsh set of four chips duration is shown. The pilot stream 64 is an all ones bit stream. Its Walsh function is also an all ones function ($W_0$). As shown in FIG. 10B, the pilot modulated stream 77 is therefore an all-ones stream. In FIG. 10B two other streams, stream A at 78 and B at 79 and their Walsh functions are also shown modulated. The IS-95-A standard provides 64 Walsh functions. The transmitter, therefore, can transmit 64 streams of symbols. The modulated (Walsh coded) bit streams are added together at 82 and then modulated (spreaded) by the PN series as shown in FIG. 11. Those skilled in the art recognize that a modulations and spreading functions are represented by complex numbers, that is, numbers having a real and an imaginary component.

The QPSK PN spreading as shown in FIG. 11 performs a complex multiplication that is generally defined as:

Spreader-Out=$[I(n)+iQ(n)]\cdot[PN(n)_I+iPN(n)_Q]$

Expanded, the equations become:

$IDs(N)=I(n)\cdot PN((n)_I-Q(n)\cdot PN(n)_Q$ $Qds(\ )n)=I(n)\cdot PN(n)_Q+Q(n)\cdot PN(n)_I$ FIG. 11 diagramatically shows how this operation is implemented.

The resulting coded and spread stream is filtered by the RC Square Root filter 63.

Having many PN periods per 26 ⅔ msec frame requires a mechanism to identify the beginning of the 26 ⅔ msec frame. However ambiguity, also, exists in the beginning of the sync channel superframe (three frames of 26 ⅔ msec). By 'marking' the beginning of the sync frame, the two problems are united and solved by the same mechanism, thus reducing the over all overhead of decoding the sync message.

The 'marking' of the sync frame is done by inducing a "phase rotation" over the transmitted signal for a set duration. The set duration is selected to be the duration of 1 sync channel symbol. The sync channel transmits 128 symbols for each 26 ⅔ msec PN code frame. For identification purposes the sync symbols are numbers 0 to 127, with the 0 symbol aligned with the start of the frame. By modulating at the same numbered symbol in the same repeat of the PN code, a synchronization marker is positioned on the signal.

Figure 12:
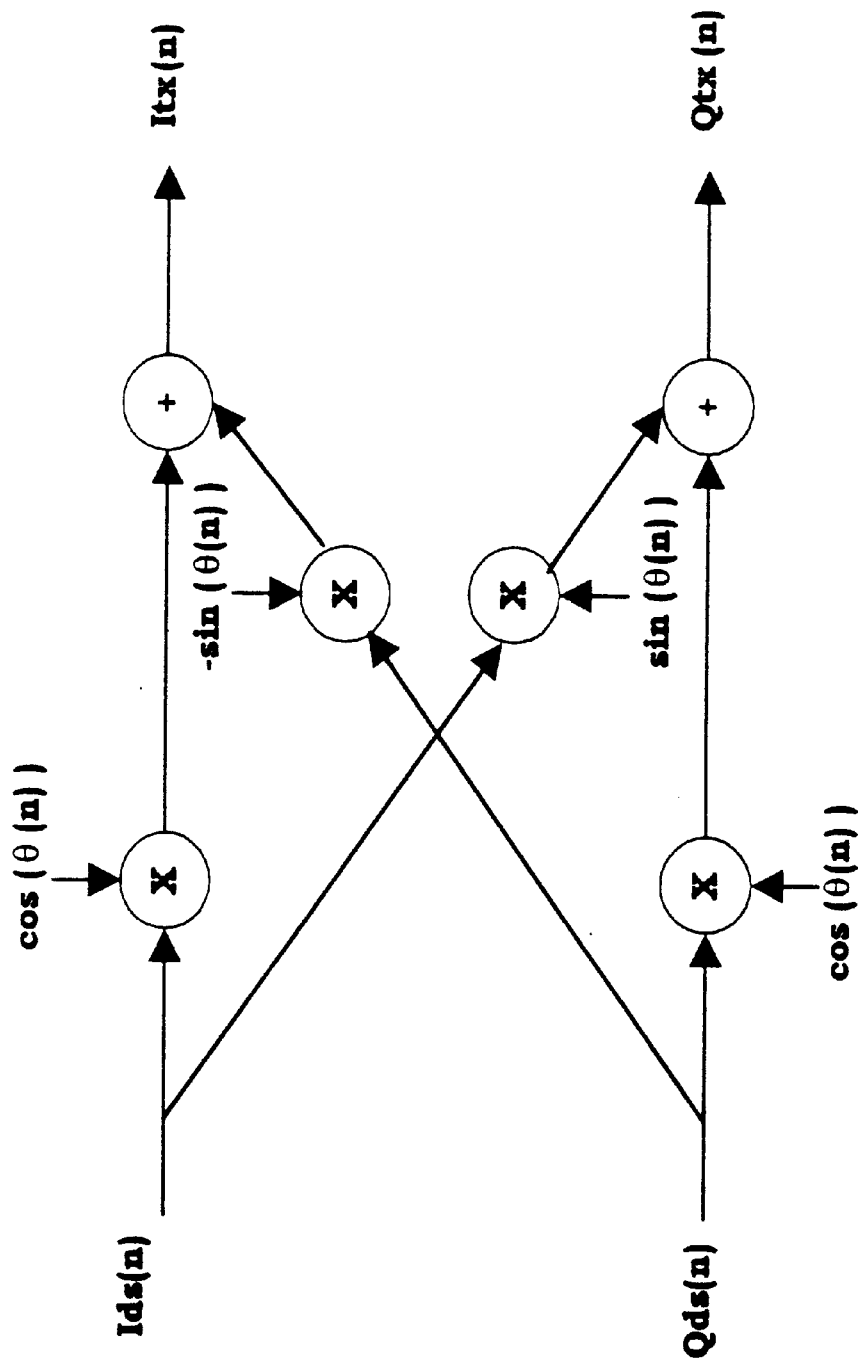
FIG. 12 diagramatically shows PN phase rotation in accordance with the present invention.
Figure 14:
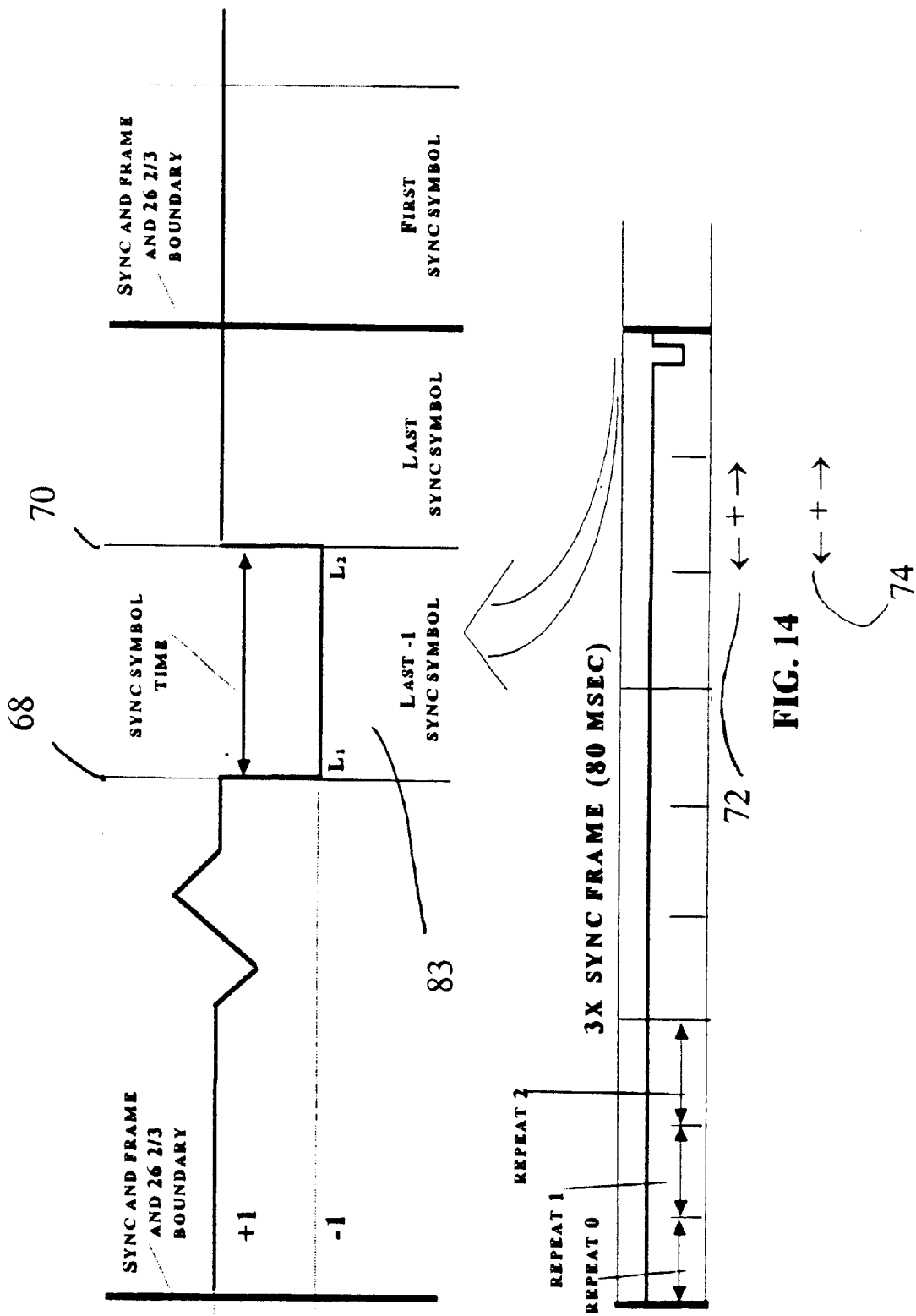
FIG. 14 diagramatically shows the position of the synchronization marker within the final PN repeat of sync channel superframe rotation in accordance with the present invention.

This sync marker is preferably located in the last PN Repeat and is one symbol before the last 83, or symbol 126, as shown in FIG. 14. PN-Phase Rotation 84 is introduced at the BS transmitter as indicated in the FIG. 9. The Phase Rotation is done on the signals after the signals 88 have been spread 86 and Walsh modulated 87. FIG. 12 diagramatically shows how the PN Phase Rotation is applied to the output from the PN spreaders.

Figure 13:
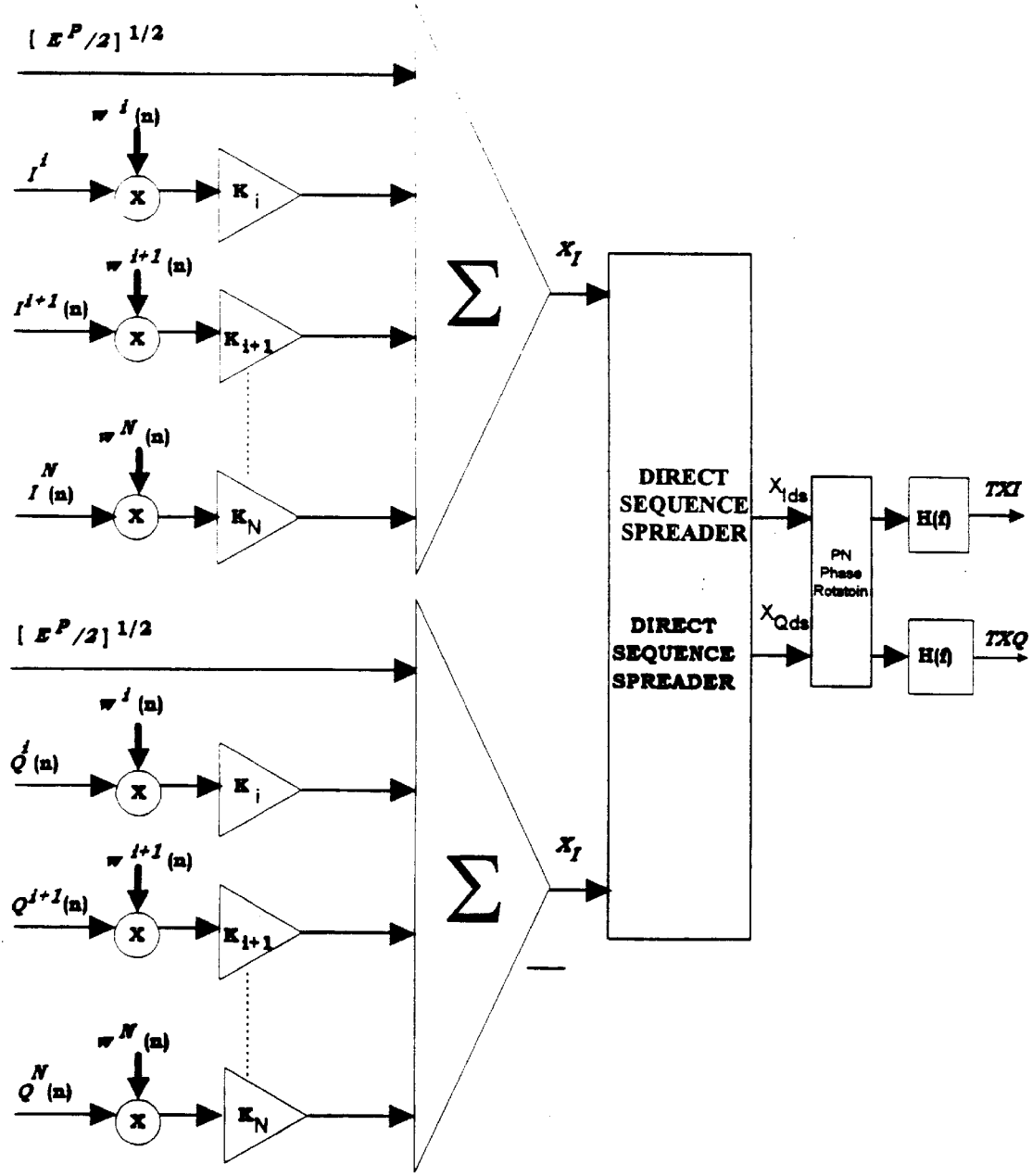
FIG. 13 diagramatically shows PN phase rotation within a base station transmitter made in accordance with the present invention.

FIG. 13 also diagramatically illustrates information signals being Walsh modulated, summed, and spread. After spreading, the communication signal has a synchronization marker added by the phase rotation.

The Scaleable CDMA System thereby introduces a periodic phase shift (phase rotation) with a known phase sequence thereby providing a synchronization marker. As shown in FIG. 9, Phase rotation is a modification in the BS modulation scheme. With Phase rotation the ambiguity in the sync channel superframe is resolved in an earlier stage of establishing communication with the base station. Therefore, less time and minimum overhead is required.

As illustrated in FIG. 14, the base station rotates the PN-phase at chip number L1, and reverses it back in chip number L2. The first change occurs at the earlier boundary of the chip L1, the second change occurs at the later boundary of chip L2.

Referring yet to FIG. 14, $L_1$ 68 defines the chip where phase rotation begins, and $L_2$ 70 defines the chip where phase rotation ends. With a 3X system and symbol rate of 128 symbol/PN frame, L1 is also identified by the time offset $T_1$ 72 for 126 sync symbols, where T1 is measured from the start of the third PN frame.

$T_1=126/128\cdot(26\ ⅔)$ [mse]

L2 has a time corresponded to $T_2$ where $T_2=127/128\cdot(26\ ⅔)$ [msec]

As indicated below, in a 3X system the phase rotation begins at L1, when the last PN cycle in the sync reaches code number 31232, and the phase rotation ends when the last PN cycle in the sync from passes 32000.

$L1=T_1\cdot 3\cdot 1.2288e6-2^{16}=31232$ $L2=T_2\cdot 3\cdot 1.2288e6-2^{16}=32000$

EXAMPLES

PN-Phase Rotation for A CDMA System with A Chip Rate 1.2288 MHz (1X)

Figure 15:
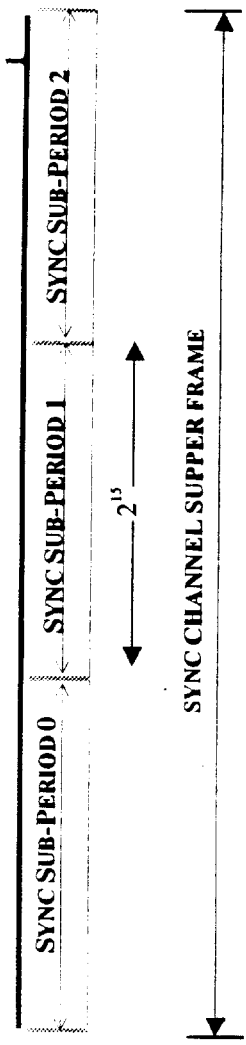
FIG. 15 shows diagramatically the phase rotation applied to a 1X system rotation in accordance with the present invention.

The channel superframe has a period of 80 msec, which is exactly three PN periods as shown FIG. 15. Sync Sub-Period 0 is the 1$^{st}$ 26 ⅔ msec period in the sync frame. The 2$^{nd}$ 26 ⅔ msec is Sync Sub-Period 1 and Sync Sub-Period 2 is the third 26 ⅔ msec in the frame. In a 1X system, the PN-phase has no rotation in order to maintain compatibility with the current existing standard.

PN-Phase Rotation for A CDMA System with A Chip Rate 3.6864 MHz (3X)

Figure 16:
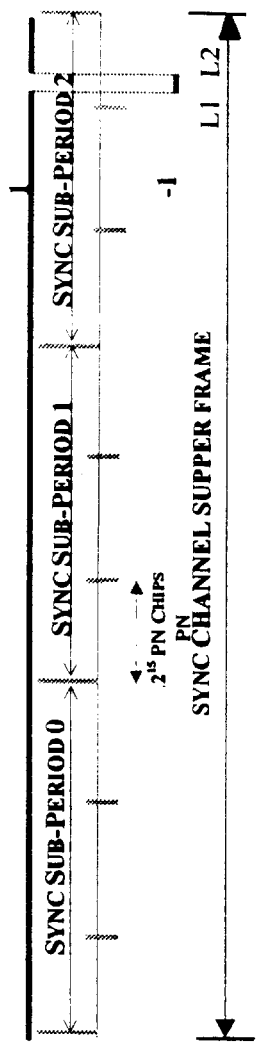
FIG. 16 shows diagramatically phase rotation for a 3X system rotation in accordance with the present invention.

As discussed, a 3X system has a chip rate of 3.6864 MHz (3×1.2288 MHz). Each Sync Sub Period is 26 ⅔ msec long and comprises three PN repeats of the 32768 element PN series as shown in FIG. 16. $L_1$ and $L_2$ are in the last repeat of the PN series in the sync frame and are determined as discussed above.

PN-Phase Rotation for A CDMA System with A Chip Rate 7.3728 MHz (6X)

Figure 17:
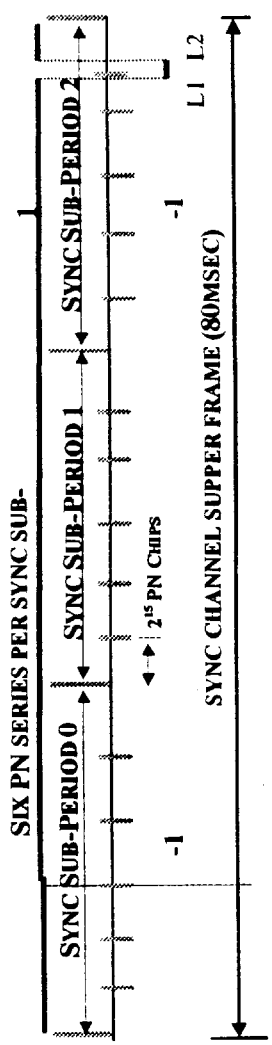
FIG. 17 diagramatically shows phase rotation for a 6X system rotation in accordance with the present invention.

An 6X system has a chip rate of 7.3728 MHz (6×1.2288 MHz). The sync message has 18 periods of the PN series as shown in FIG. 17. $L_1$ and $L_2$ are in the last repeat of the PN series in the sync frame and are determined as discussed above.

PN-Phase Rotation for A CDMA System with A Chip Rate 11.0592 MHz (9X)

Figure 18:
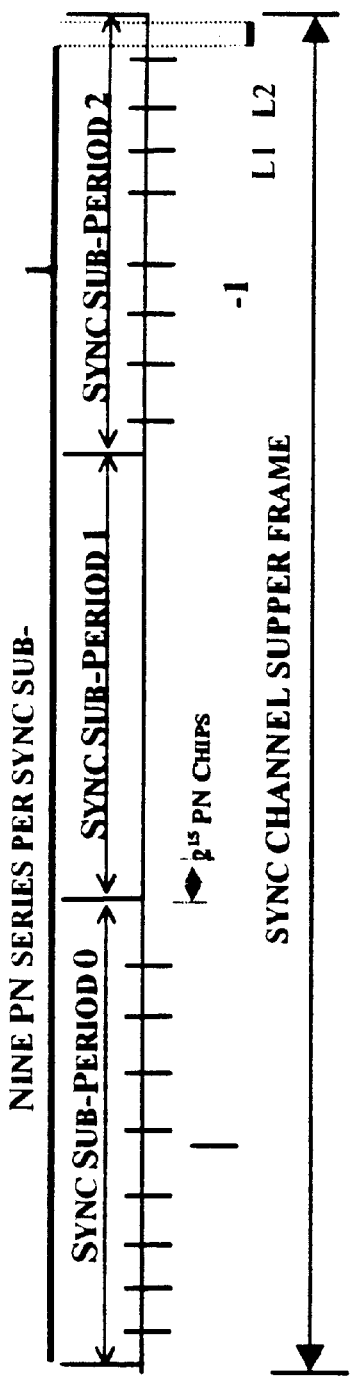
FIG. 18 diagramatically shows phase rotation for a 9X system rotation in accordance with the present invention.

A 9X system has a chip rate of 11.0592 MHz (9×1.2288 MHz). The sync message has 27 periods of the PN series as shown in FIG. 18. $L_1$ and $L_2$ are in the last repeat of the PN series in the sync frame and are determined as discussed above.

PN-Phase Rotation for A CDMA System with A Chip Rate 14.7456 MHz (12X)

Figure 19:
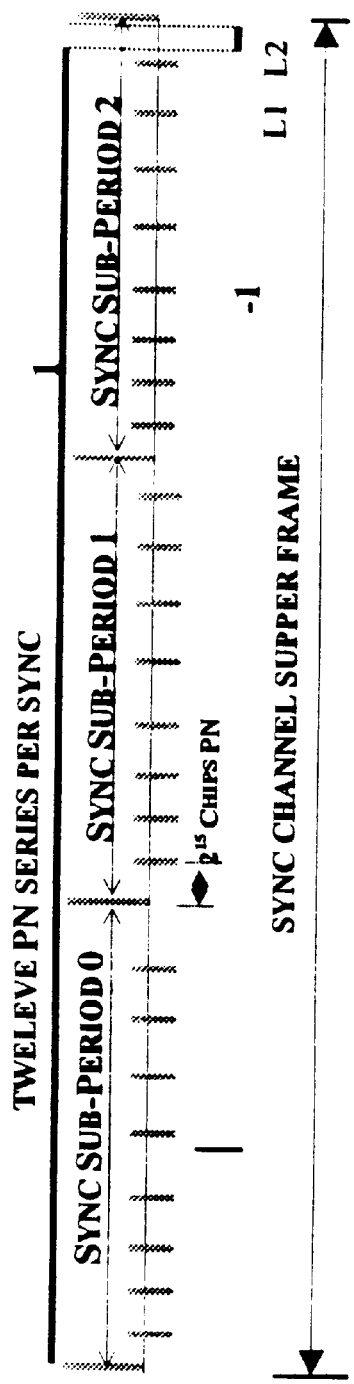
FIG. 19 diagramatically shows phase rotation for a 12X system rotation in accordance with the present invention.

A 12X system has a chip rate of 14.7456 MHz (12×1.2288 MHz). The sync message has 36 periods of the PN series as shown in figure FIG. 19. $L_1$ and $L_2$ are in the last repeat of the PN series in the sync frame and are determined as discussed above.

Figure 20:
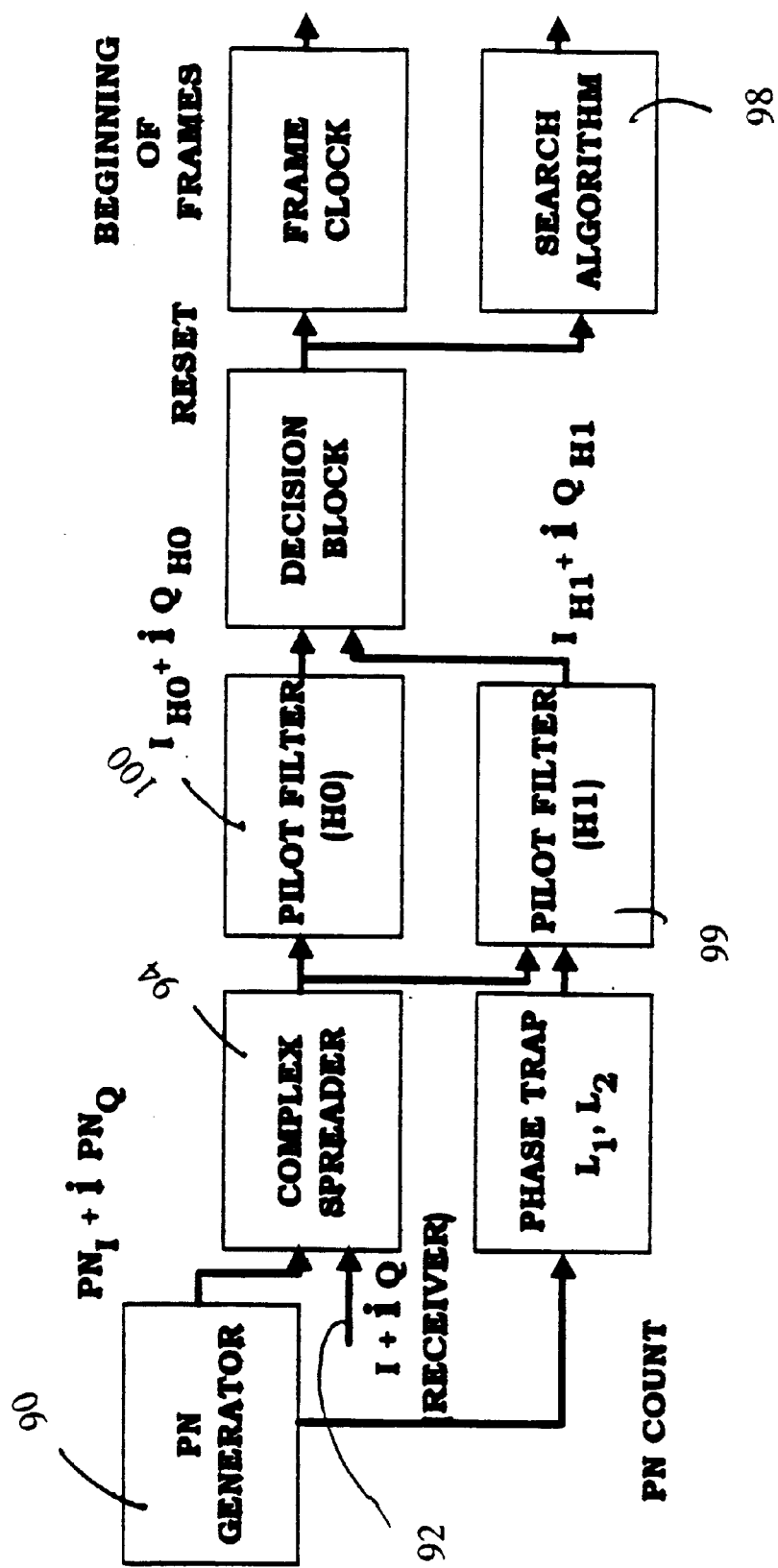
FIG. 20 is a block diagram showing a CDMA system in accordance with the present invention identifying the beginning of a sync message.

Turning now to the subscriber unit, a method of detecting the synchronization marker is described. Prior to identifying the beginning of the sync channel message capsule, the subscriber unit timing algorithm has to lock to the received PN series in two stages:
1. Searching—locking to PN series
2. Sync and frame 26 ⅔ acquisition—detecting the beginning of the frames FIG. 20 shows a functional block diagram that performs the above two functions. In search mode the local PN generator 90 is trying to lock to the received signal. The process of complex de-spreading 94 and pilot filtering 96 amounts to correlation between the local PN series and the received signal.

The Pilot Filter output 96 is the correlation result between the received signal 92 and the PN generator 90. Its power is above a given threshold only if there is match between the local PN generator 90 and the incoming signal 92. This will cause the Search Algorithm 98 to report the event. Consequently, other functional blocks will be activated in order to maintain and synchronize the PN generator with the incoming signal. The result is locking to the base station.

The searching is a temporal correlation between periodical chip pattern (PN series) transmitted by the base station and a local PN series. In this stage, duration of each chip is described by several samples. Thus, this search is done in higher resolution (several time per chip time).

During searching the PN period where the phase is reverse is unknown. More over, the filters operates in a 'sliding window' mode where the induced phase change may be in part of the sum. However, we know the location L1:12 where this phase change may occur. We therefore, apply two pilot filters with one filter 100 operating based on the hypothesis $H_0$:

$H_0$—NO PHASE REVERSE IS INDUCED BY THE BASE STATION (within $L_1:L_2$)

The other filter 99 on the hypothesis $H_1$:

$H_1$—A PHASE REVERSE IS INDUCED BY THE Base Station.(within L1:L2)

Figure 21:
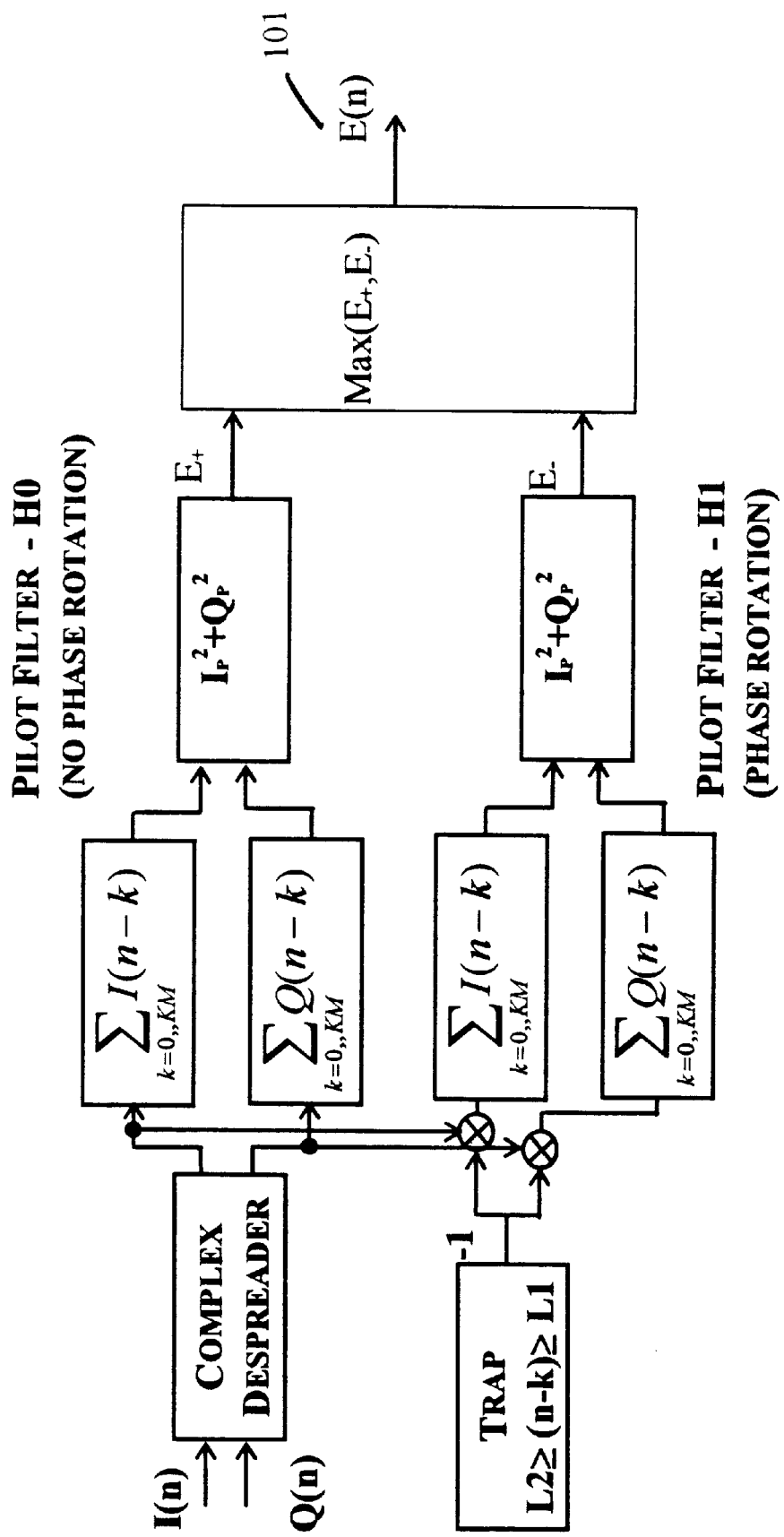
FIG. 21 diagramatically shows the pilot filters during search mode rotation in accordance with the present invention.

FIG. 21 shows the two pilot filters 99 and 100. The maximum out of the two square envelope is taken only in the cases the chip number is such that the phase may be reversed by the base station.

Figure 23:
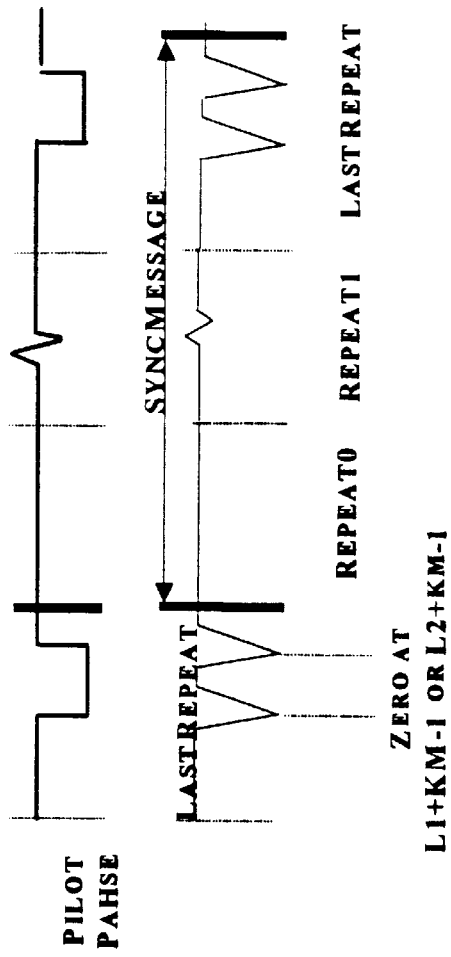
FIG. 23 diagramatically shows the detection of the sync marker rotation in accordance with the present invention.
Figure 24:
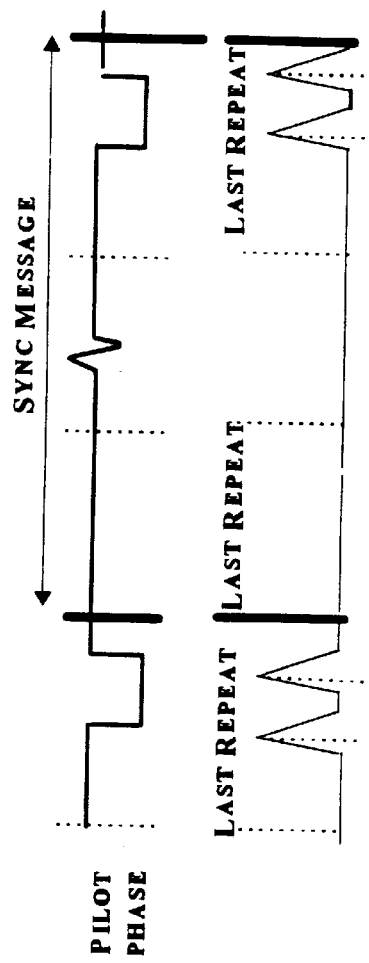
FIG. 24 diagramatically shows the detection of the sync marker in accordance with the present invention.

For example, if the summation is such that the phase change occurs in the 'middle' of the summation process, the H0 pilot filter 100 produces zero (a phase change of $\pi$ reverses the sign of half of the total sum). The H1 pilot filter 99, in that case, produces the full signal. The valves of E+ and E− are shown diagramatically in FIGS. 23 and 24 respectively.

By taking the maximum($E_+$, $E_-$), the phase change becomes apparent to the search operation.

Once the subscriber unit PN generator locks to the base station, it moves to its next task of identifying the beginning of frame 26 ⅔ and the sync superframe.

Figure 22:
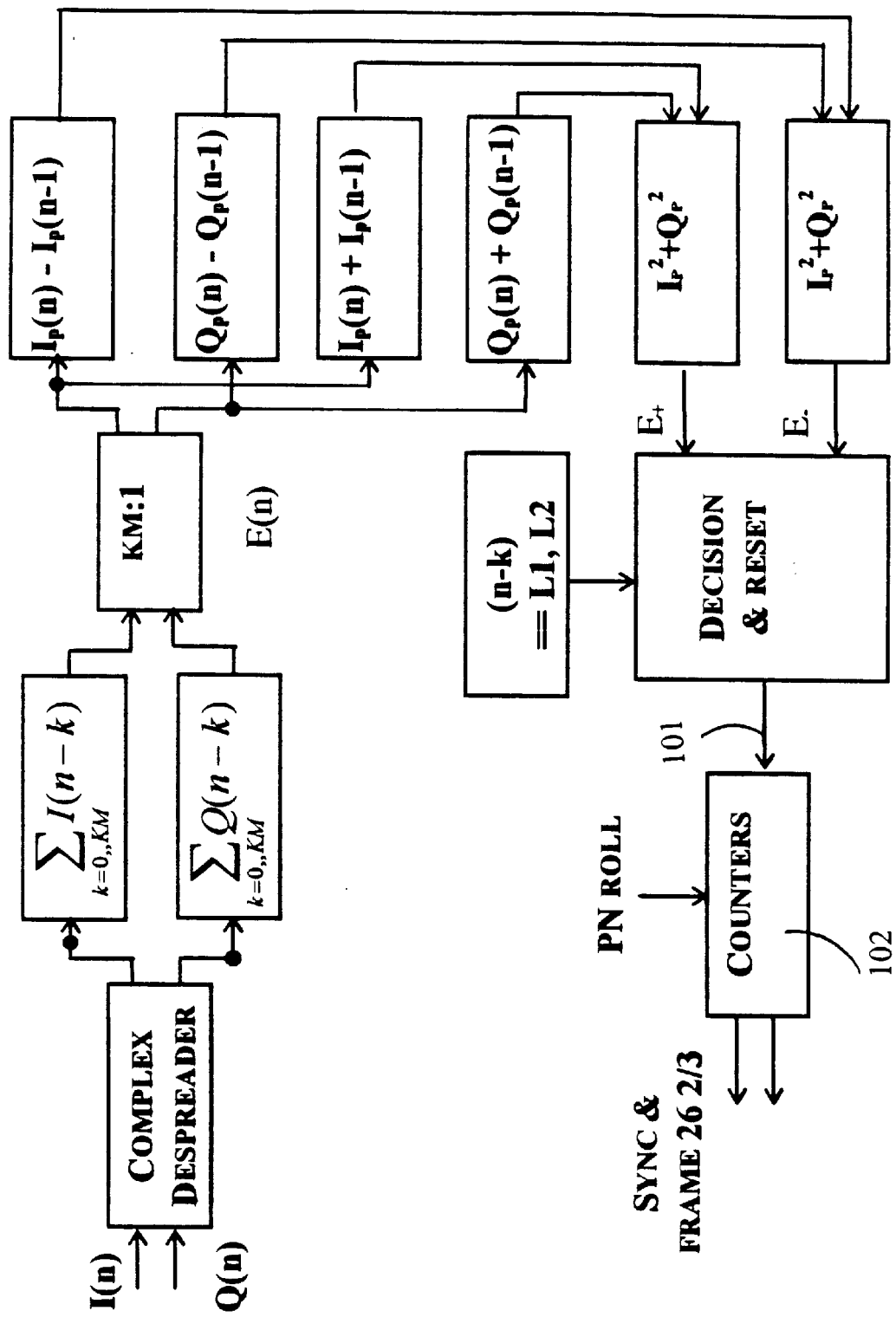
FIG. 22 diagramatically shows a functional description of the synchronization and frame 26 ⅔ detection in accordance with the present invention.

FIG. 22. is the functional description of the sequence of operations taking place to identify the frame's beginning. It is sufficient to test the filter output 101 once per KM chips where KM is the summation length (M is the duration of the Walsh code in chips and K is the multiple factor). The duration of the phase change is longer than KM because.

$L1 = K_1 \cdot K \cdot M;$ $L2 = K_2 \cdot K \cdot M;$ where $K_1$, $K_2$ are integers and L1, L2, are the chip number where phase change may occur.

Figure 25:
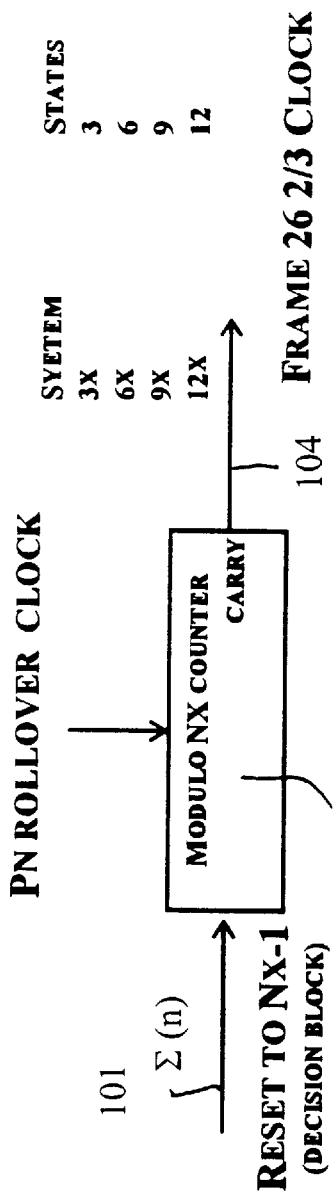
FIG. 25 diagramatically demonstrates the frame 26 ⅔ clock in accordance with the present invention.

Each PN period at L1+KM−1, L2+Km−1 the decision block (FIG. 25) compares $E_+$, $E_-$ and decides which of the hypotheses is correct. When the sync marker is located, the sync marker is indicated on E(n) 101.

At n=L1+KM−1, L2+KM−1 if($E_+ \geq E_-$+Threshold) H0 is correct (No phase change occur)

if($E_- \geq E_+$+Threshold) H1 is correct

A counter with Nx states is dedicated to identify the beginning of frame 26 ⅔. The counter advances to the next state by the PN roll clock. Such a counter generates a carry once per each Nx PN periods on the transition from state (Nx−1) to zero. A positive identification of the last PN period by locating the sync marker is used to force the counter to state (Nx−1). Thereby, E(n) 101 rests the counters 102 to an Nx−1 count. Consequently, the next PN clock pulse which is at the beginning of the frame 26 ⅔ advances the counter from (Nx−1) to zero with the result of generating a carry (see FIG. 25). Thereby, counter out 104 indicates the 26 ⅔ msec PN frame boundaries.

Since the 26 ⅔ frame counter identifies and counts repeat frame boundaries, the subscriber unit is able to determine which repeat of the PN code is presently being transmitted. The subscriber unit may therefore use the repeat count information to avoid interference from base stations transmitting a close code, but operating in a different repeat number.

Figure 26:
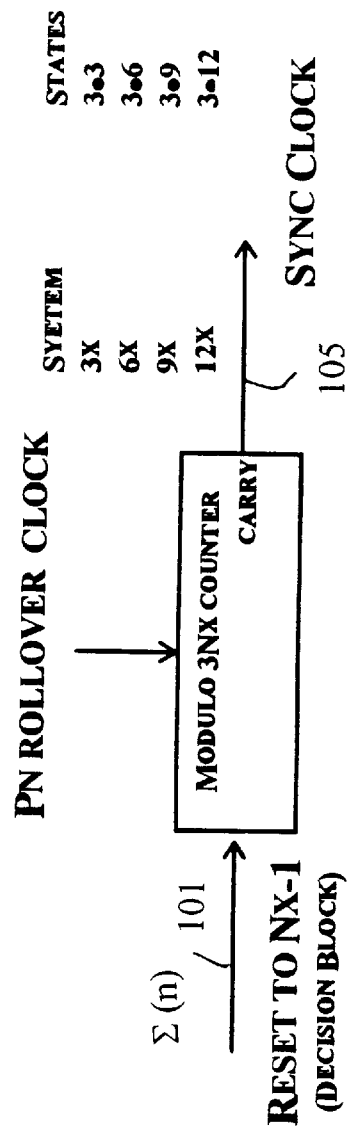
FIG. 26 diagramatically displays the synchronization frame clock in accordance with the present invention.

FIG. 26 shows counter with 3Nx states to identify the beginning of the sync message. It operates in a similar fashion as the counter described above. Each time a sync marker is identified E(n) 101 forces the counter 103 to 3Nx−1. Thereby the next PN roll advances the counter to indicate the start of the sync frame. As a result of forcing it to the state (3Nx−1), it generate a carry at the next pn roll. Thereby, counter out 105 indicates the boundaries of the sync frame.

By using the output from the counters 104 and 105, the subscriber unit synchronizes to the base station more efficiently and with reduced ambiguity thereby minimizing power drain and data throughput. This in return lengthens the battery life in the subscriber unit, reduces the drop out rate, and makes a more reliable communication system. Further, the means to identify a sequence of PN periods frees us from restriction of having 3 PN period per a sync message or one PN period per 26 ⅔ msec.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for scaling a frame-based communications system, the communications system having a base chip rate, a base short code series, and overhead and data channels, the method comprising:

selecting a system chip rate that is a multiple of the base chip rate, so that the communication system has a greater data-handling capacity than a system operating at the base chip rate;

defining a system short code series that repeats the base short code series the multiple times wherein the frame duration for the communication system remains constant whether the base chip rate or the system chip rate is used;

rotating the phase of the overhead and the data channels for a duration each frame, the duration starting at an offset from the end of the frame;

resetting the phase of the overhead and the data channels to their nominal phase at the end of the duration, whereby the resulting periodic phase rotation provides a periodic synchronization marker; and synchronizing a mobile station to the synchronization marker.

2. The method for scaling a frame-based communications system according to claim 1 where the overhead channel further comprises a synchronization channel, the synchronization channel repeating a symbol message a plurality of times each frame, wherein the synchronization marker corresponds to the next to the last symbol message in each frame.

3. The method for scaling a frame-based communications system according to claim 1 where the base chip rate is 1.2288 mhz.

4. The method for scaling a frame-based communications system according to claim 1 where the system chip rate is selected from a group consisting of 3.6864 MHz, 7.3728 MHz, 11.0592 MHz, and 14.7456 MHz.

5. The method for scaling a frame-based communications system according to claim 1 where the multiple is selected from a group consisting of 3, 6, 9, and 12.

6. The method for scaling a frame-based communications system according to claim 1 where the communications system is a CDMA communications system.

7. The method for scaling a frame-based communications system according to claim 1 where the base short code series is a PN code series having 32,768 codes.

8. A communications system comprising:
   a plurality of base stations, with each base station transmitting frame-based communications comprising overhead and data channels, wherein the frame from each base station is temporally offset from the frames from adjacent base stations;
   a system chip rate set to a multiple of a base chip rate;
   a system code sequence defined by repeating a base code sequence, the system code sequence used to encode the overhead and data channels, and the encoded overhead and data channels being summed together into an encoded signal;
   means for rotating the phase of the encoded signal for a duration at an offset from the end of each of the frames, thereby causing a synchronization marker to be transmitted from each base station, the synchronization marker being indicative of the frame's boundary;
   a plurality of subscriber units configured to receive the encoded signal from the base stations, each subscriber unit station capable of establishing a two-way communication with each of the base stations, and each subscriber unit further configured to detect and synchronize to the synchronization marker.

9. The communications system according to claim 8 where the base chip rate is 1.2288 MHz and the multiple is selected from a group consisting of 3,6,9, and 12.

10. The communications system according to claim 8 where the frames are each 80 milliseconds and the system code is repeated 3 times within the frame, thereby each repeat of the system code occurs within a sub-frame of 26 ⅔ milliseconds.

11. The communications system according to claim 10 where the base code is repeated 3, 6, 9, or 12 times in the system code.

12. The communications system according to claim 8 where the base code is a pseudo noise code having 32,768 elements.

13. The communications system according to claim 8 where the communications system is compatible with an existing IS-95 CDMA communications system.

14. A base station for transmitting a frame-based communication to a subscriber unit, the base station comprising:
   a client device providing an information signal to a control processor;
   a baseband means receiving an encoded signal from the control processor and creating a baseband signal, the encoded signal being indicative of the information signal;
   an intermediate frequency means receiving the baseband signal and producing an intermediate signal, the intermediate signal received by a radio frequency means which produces a radio signal which is transmitted to the subscriber unit through an antennae; and
   wherein the control processor further comprises:
      means for receiving the information signal;
      means for modulating the information signal and an overhead signal with a Walsh code, the modulated information signal and the modulated overhead signal being summed together;
      means for spreading the summed signal using a code series;
      means for rotating the phase of the spread signal for a duration each frame, thereby adding a synchronization marker to the spread signal; and
      means for filtering the spread signal to produce the encoded signal.

15. A control processor for a frame-based communications system, the control processor comprising:
   means for receiving a plurality of information signals and at least one overhead signal, the information signals and overhead signal being provided in a digital form with each information signal and overhead signal received on a different channel;
   means for modulating each channel with a code, the code assigned to each channel being different;
   means for summing the modulated channels together;
   means for spreading the summed signal using a code series, the code series having multiple repetitions of a base code series;
   means for rotating the phase of the spread signal for a duration each frame, thereby adding a synchronized marker to the spread signal;
   means for filtering the spread signal to produce an encoded signal; and
   wherein the spreading operation is performed at a system chip rate which is a multiple of a base chip rate.

16. The base station according to claim 15 where the base chip rate is 1.2288 MHz and the multiple is selected from a group consisting of 3, 6, 9, and 12.

17. A method for providing a synchronization marker on a frame-based communications signal sent from a base station to a subscriber unit, the communication signal comprising a synchronization frame having a plurality of code frames, the method compromising:
   summing information channels into a summed signal at the base station;
   rotating the phase of the summed signal for a duration each synchronization frame thereby adding the synchronization marker to the communications signal, the duration starting in the last code frame in each frame and positioned at a consistent offset from the end of the synchronization frame;
   transmitting the communication signal to the subscriber unit, the subscriber unit configured to identify the start of the code frames;
   detecting the synchronization marker in the subscriber unit; and
   generating synchronization signal in the subscriber unit corresponding to the start of the synchronization frame, the synchronization signal being generated in response to the first code frame identified after detecting the synchronization marker.

18. The method according to claim 17 further comprising:

initializing a code frame counter when the synchronization marker is detected; and advancing the code frame counter each time the code frame is identified, so that the code frame counter indicates which of the plurality of code frames is being received.

19. A method for spreading a communication signal using a system code series that is encoding at a system chip rate, the method operating on a plurality of base stations, comprising:

defining the system code series to be a plurality of repetitions of a base code series;

selecting a system chip rate that is a multiple of a base chip rate;

assigning each base station a sequential index number; and offsetting each base station an offset time from the next consecutively number base station, the offset time being constant as different system chip rates are selected.

20. The method according to claim 19 further comprising:

receiving in a subscriber unit the communications signal, including a signal indicative of the system code series; and identifying in the subscriber unit which repetition of the base code series is being received by locating and counting the rolls of the base code, the counter being initialized to start a new count at the start of each system code series.

21. A device for providing a synchronization marker on a frame-based communications signal sent from a base station to a subscriber unit, the communication signal comprising a synchronization frame having a plurality of code frames, the device comprising:

means for summing information channels into a summed signal at the base station;

means for rotating the phase of the summed signal for a duration each synchronization frame thereby adding the synchronization marker to the communications signal, the duration starting in the last code frame in each frame and positioned at a consistent offset from the end of the synchronization frame;

means for transmitting the communication signal to the subscriber unit, the subscriber unit configured to identify the start of the code frames;

means for detecting the synchronization marker in the subscriber unit; and means for generating a synchronization signal in the subscriber unit corresponding to the start of the synchronization frame, the synchronization signal being generated response to the first code frame identified after detecting the synchronization marker.

22. The device according to claim 21 further comprising:

means for initializing a code frame counter when the synchronization marker is detected; and means for advancing the code frame counter each time the code frame is identified, so that the code frame counter indicates which of the plurality of code frames is being received.

23. A device for spreading a communication signal using a system code series that is encoding at a system chip rate, the device operating on a plurality of base stations, comprising:

means for generating the system code series, the system code series comprising a plurality of repetitions of a base code series;

means for selecting a system chip rate that is a multiple of a base chip rate;

means for assigning each base station a sequential index number; and means for offsetting each base station an offset time from the next consecutively number base station, the offset time being constant as different system chip rates are selected.

24. The device according to claim 23 further comprising:

means for receiving in a subscriber unit the communications signal, including a signal indicative of the system code series; and means for identifying in the subscriber unit which repetition of the base code series is being received by locating and counting the rolls of the base code, the counter being initialized to start a new count at the start of each system code series.

* * * * *

UNITED STATES PATENT AND TRADEMARK OFFICE
CERTIFICATE OF CORRECTION

PATENT NO : 6,173,006 B1
DATED : January 9, 2001
INVENTOR(S): Kent et al

Figure 1:
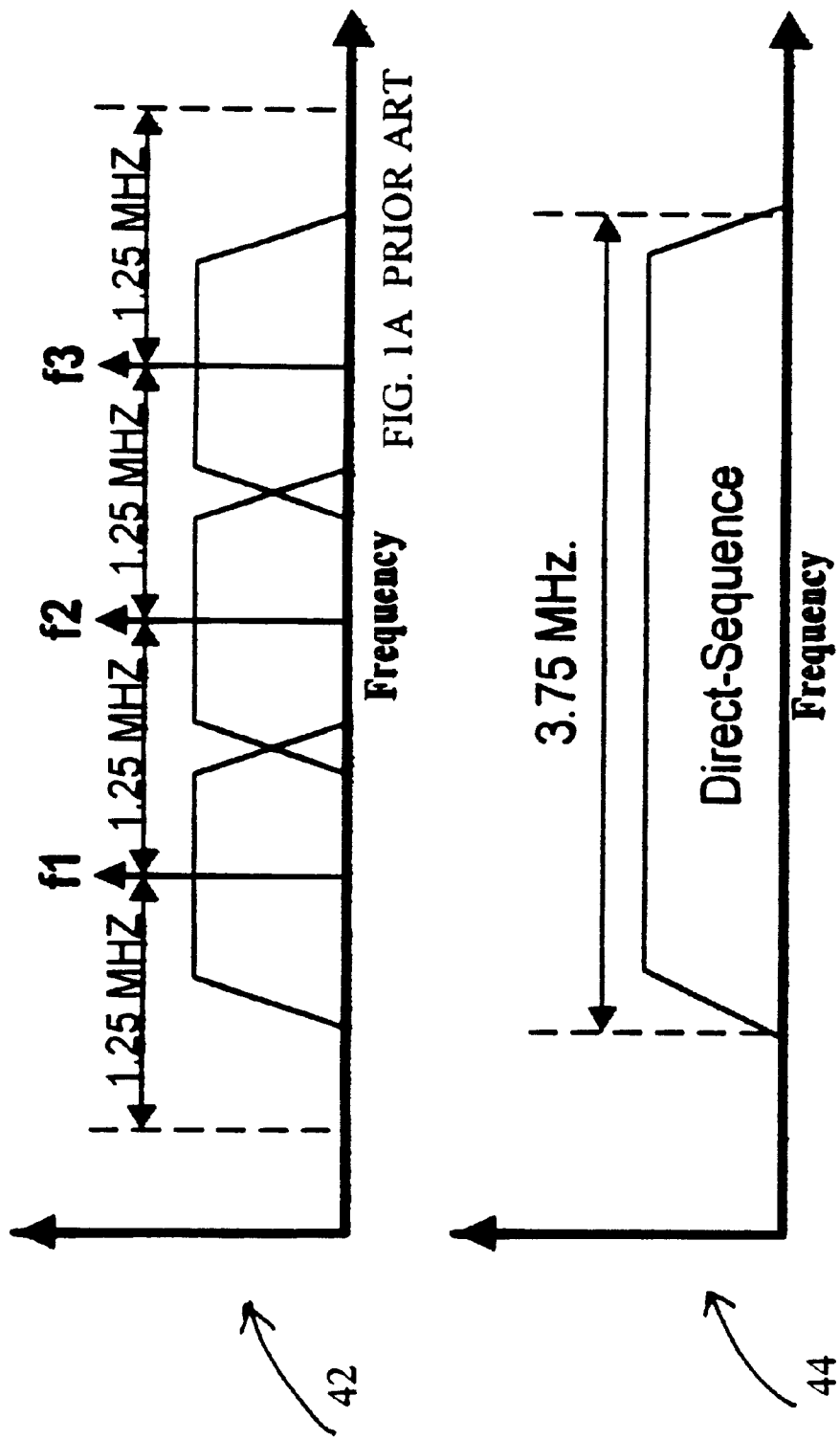
FIG. 1A is a diagram showing direct sequence implementation of a third generation CDMA system.
FIG. 1B is a diagram showing a multi-carrier implementation of a third generation CDMA system.
Figure 2:
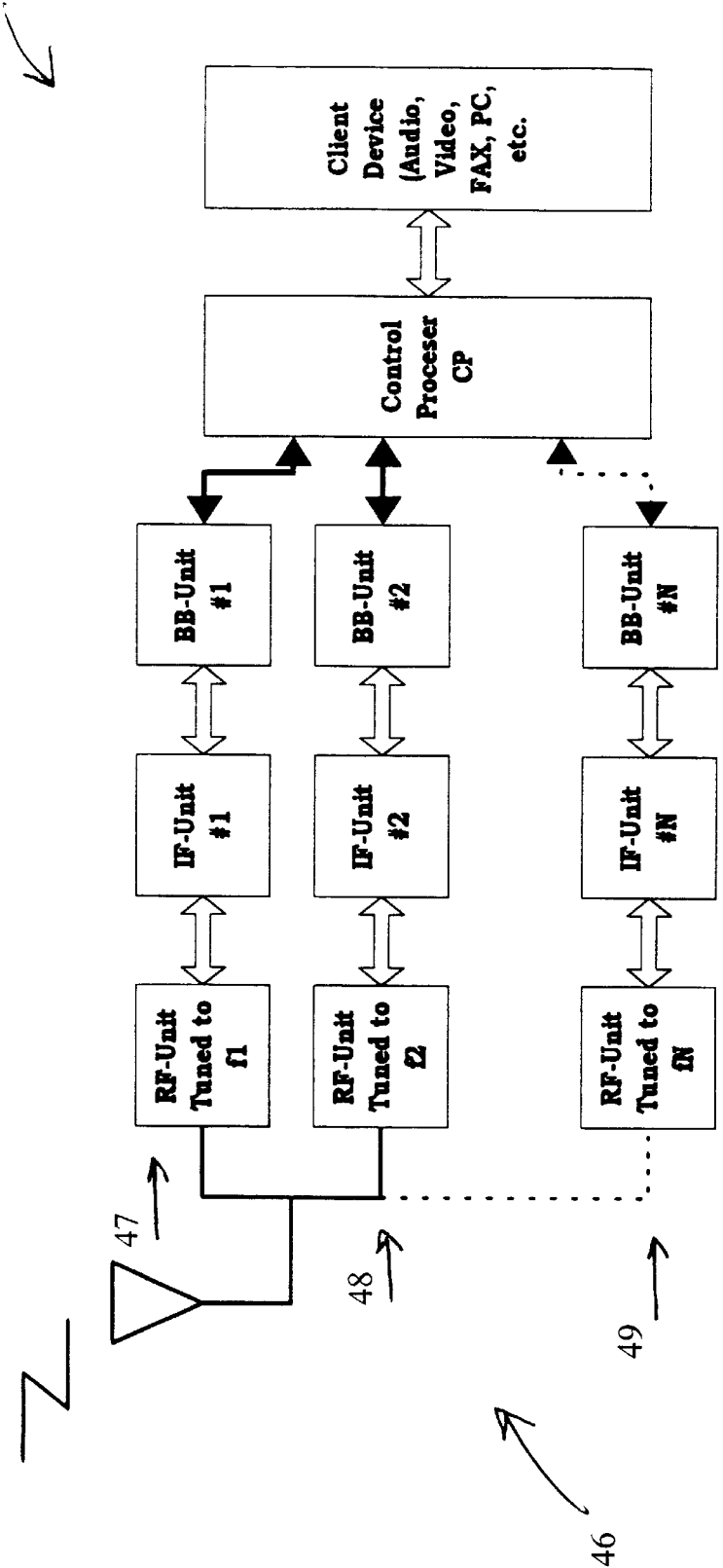
FIG. 2 is a block diagram of a multi carrier CDMA third generation system.
Figure 3:
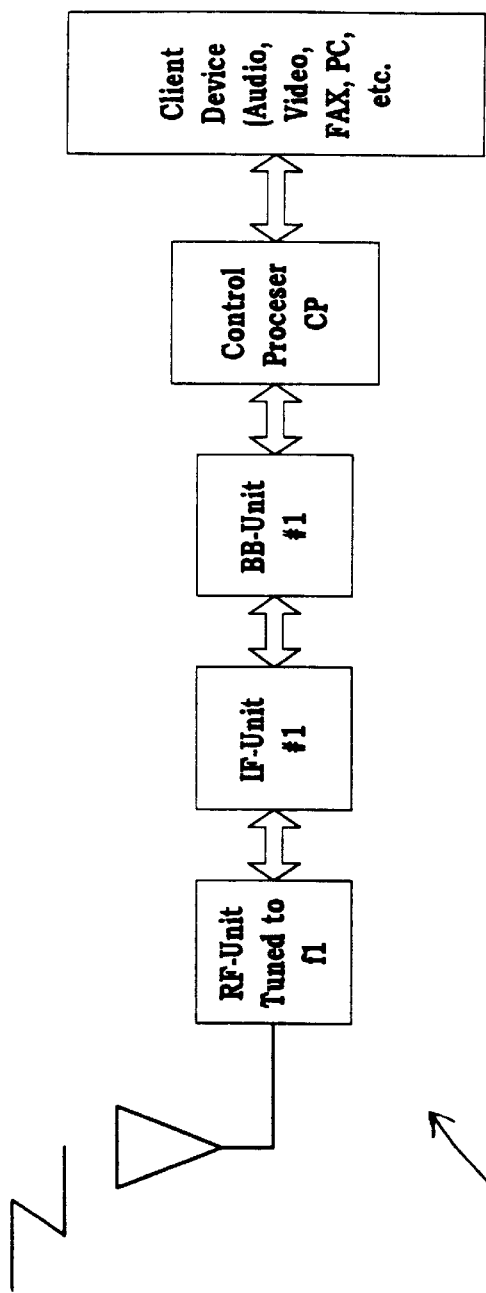
FIG. 3 is a diagram of a direct sequence CDMA third generation system.
Figure 4:
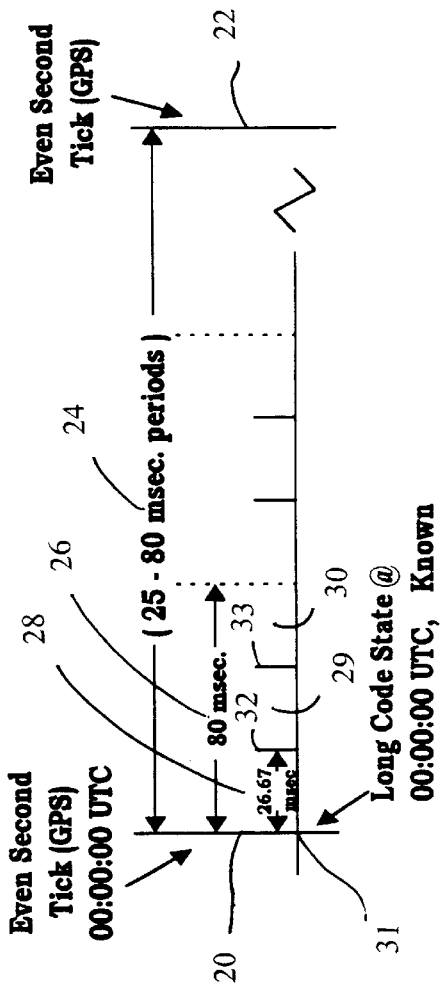
FIG. 4 is a diagram showing GPS even second marks, the 80 msec sync frame and the 26.67 msec PN frame used for the CDMA system.

It is certified that error appears in the above-identified patent and that said Letters Patent is hereby corrected as shown below:

Column 3, line 21 after "in" dlete FIG.1 and substitute thereof ---FIGS. 1A and 1B---

Signed and Sealed this

Twenty-ninth Day of May, 2001

Attest:

NICHOLAS P. GODICI

Attesting Officer     Acting Director of the United States Patent and Trademark Office